United States Patent
Xue et al.

(10) Patent No.: US 12,250,679 B2
(45) Date of Patent: Mar. 11, 2025

(54) HELPER USER EQUIPMENT FOR RETRANSMISSION OF SIDELINK COMMUNICATIONS IN A SINGLE-FREQUENCY NETWORK

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/443,880

(22) Filed: Jul. 28, 2021

(65) Prior Publication Data
US 2023/0035313 A1 Feb. 2, 2023

(51) Int. Cl.
| | |
|---|---|
| *H04W 72/20* | (2023.01) |
| *H04L 5/00* | (2006.01) |
| *H04W 72/044* | (2023.01) |
| *H04W 72/121* | (2023.01) |
| *H04W 72/23* | (2023.01) |
| *H04W 88/04* | (2009.01) |

(52) U.S. Cl.
CPC ........... *H04W 72/20* (2023.01); *H04L 5/0055* (2013.01); *H04W 72/044* (2013.01); *H04W 72/121* (2013.01); *H04W 72/23* (2023.01); *H04W 88/04* (2013.01)

(58) Field of Classification Search
CPC . H04W 72/20; H04W 72/044; H04W 72/121; H04W 72/23; H04W 88/04; H04W 72/40; H04W 92/18; H04L 5/0055
See application file for complete search history.

(56) References Cited

U.S. PATENT DOCUMENTS

| | | | |
|---|---|---|---|
| 2011/0064018 A1* | 3/2011 | Hottinen | H04W 72/046 370/329 |
| 2011/0164536 A1* | 7/2011 | Lin | H04L 12/66 370/259 |
| 2012/0307673 A1* | 12/2012 | Chang | H04W 72/542 370/336 |
| 2013/0034045 A1* | 2/2013 | Kwon | H04W 40/246 370/315 |

(Continued)

*Primary Examiner* — Edan A Orgad
*Assistant Examiner* — Malick A Sohrab
(74) *Attorney, Agent, or Firm* — Harrity & Harrity, LLP

(57) ABSTRACT

Various aspects of the present disclosure generally relate to wireless communication. In some aspects, a helper user equipment (UE) may receive, from a base station, a signaling message requesting the helper UE to monitor for and transmit a sidelink communication in a manner that uses a single-frequency network, wherein the sidelink communication is to be transmitted by a source UE to a destination UE that is different from the helper UE. The helper UE may receive the sidelink communication, transmitted by the source UE to the destination UE, in a first time-frequency resource of the single-frequency network. The helper UE may transmit the sidelink communication in a second time-frequency resource of the single-frequency network, wherein the second time-frequency resource is indicated to the helper UE by the base station. Numerous other aspects are described.

20 Claims, 17 Drawing Sheets

(56) References Cited

U.S. PATENT DOCUMENTS

| | | | |
|---|---|---|---|
| 2018/0077608 A1* | 3/2018 | Jung | H04W 76/14 |
| 2018/0139741 A1* | 5/2018 | Wang | H04L 45/74 |
| 2018/0288588 A1* | 10/2018 | Uchiyama | H04W 4/38 |
| 2019/0342910 A1* | 11/2019 | Cao | H04L 5/0091 |
| 2021/0050950 A1* | 2/2021 | Zhou | H04W 76/14 |
| 2023/0171036 A1* | 6/2023 | Selvanesan | H04L 1/1635 |
| | | | 370/315 |

* cited by examiner

HELPER USER EQUIPMENT FOR RETRANSMISSION OF SIDELINK COMMUNICATIONS IN A SINGLE-FREQUENCY NETWORK

FIELD OF THE DISCLOSURE

Aspects of the present disclosure generally relate to wireless communication and to techniques and apparatuses associated with a helper user equipment for retransmission of sidelink communications in a single-frequency network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a helper user equipment (UE). The method may include receiving, from a base station, a signaling message requesting the helper UE to monitor for and transmit a sidelink communication in a manner that uses a single-frequency network, wherein the sidelink communication is to be transmitted by a source UE to a destination UE that is different from the helper UE. The method may include receiving the sidelink communication, transmitted by the source UE to the destination UE, in a first time-frequency resource of the single-frequency network. The method may include transmitting the sidelink communication in a second time-frequency resource of the single-frequency network, wherein the second time-frequency resource is indicated to the helper UE by the base station.

Some aspects described herein relate to a method of wireless communication performed by a source UE. The method may include receiving, from a base station, a signaling message indicating that a helper UE is to monitor for and transmit a sidelink communication, to be transmitted by the source UE to a destination UE, in a manner that uses a single-frequency network. The method may include transmitting the sidelink communication to the destination UE in a first time-frequency resource of the single-frequency network based at least in part on receiving the signaling message. The method may include retransmitting the sidelink communication in a second time-frequency resource of the single-frequency network, wherein the second time-frequency resource is indicated to the helper UE by the base station.

Some aspects described herein relate to a method of wireless communication performed by a base station. The method may include identifying a helper UE to assist with retransmission of one or more sidelink communications, to be transmitted by a source UE to a destination UE, using a single-frequency network. The method may include transmitting, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE.

Some aspects described herein relate to a helper UE for wireless communication. The helper UE may include a memory and one or more processors coupled to the memory. The one or more processors may be configured to receive, from a base station, a signaling message requesting the helper UE to monitor for and transmit a sidelink communication in a manner that uses a single-frequency network, wherein the sidelink communication is to be transmitted by a source UE to a destination UE that is different from the helper UE. The one or more processors may be configured to receive the sidelink communication, transmitted by the source UE to the destination UE, in a first time-frequency resource of the single-frequency network. The one or more processors may be configured to transmit the sidelink communication in a second time-frequency resource of the single-frequency network, wherein the second time-frequency resource is indicated to the helper UE by the base station.

Some aspects described herein relate to a source UE for wireless communication. The source UE may include a memory and one or more processors coupled to the memory. The one or more processors may be configured to receive, from a base station, a signaling message indicating that a helper UE is to monitor for and transmit a sidelink communication, to be transmitted by the source UE to a destination UE, in a manner that uses a single-frequency network. The one or more processors may be configured to transmit the sidelink communication to the destination UE in a first time-frequency resource of the single-frequency network based at least in part on receiving the signaling message. The one or more processors may be configured to retransmit the sidelink communication in a second time-frequency resource of the single-frequency network, wherein the second time-frequency resource is indicated to the helper UE by the base station.

Some aspects described herein relate to a base station for wireless communication. The base station may include a memory and one or more processors coupled to the memory. The one or more processors may be configured to identify a helper UE to assist with retransmission of one or more sidelink communications, to be transmitted by a source UE to a destination UE, using a single-frequency network. The one or more processors may be configured to transmit, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE.

Some aspects described herein relate to a non-transitory computer-readable medium that stores a set of instructions for wireless communication by a helper UE. The set of instructions, when executed by one or more processors of the helper UE, may cause the helper UE to receive, from a base station, a signaling message requesting the helper UE to monitor for and transmit a sidelink communication in a manner that uses a single-frequency network, wherein the sidelink communication is to be transmitted by a source UE to a destination UE that is different from the helper UE. The set of instructions, when executed by one or more processors of the helper UE, may cause the helper UE to receive the sidelink communication, transmitted by the source UE to the destination UE, in a first time-frequency resource of the single-frequency network. The set of instructions, when executed by one or more processors of the helper UE, may cause the helper UE to transmit the sidelink communication in a second time-frequency resource of the single-frequency network, wherein the second time-frequency resource is indicated to the helper UE by the base station.

Some aspects described herein relate to a non-transitory computer-readable medium that stores a set of instructions for wireless communication by a source UE. The set of instructions, when executed by one or more processors of the source UE, may cause the source UE to receive, from a base station, a signaling message indicating that a helper UE is to monitor for and transmit a sidelink communication, to be transmitted by the source UE to a destination UE, in a manner that uses a single-frequency network. The set of instructions, when executed by one or more processors of the source UE, may cause the source UE to transmit the sidelink communication to the destination UE in a first time-frequency resource of the single-frequency network based at least in part on receiving the signaling message. The set of instructions, when executed by one or more processors of the source UE, may cause the source UE to retransmit the sidelink communication in a second time-frequency resource of the single-frequency network, wherein the second time-frequency resource is indicated to the helper UE by the base station.

Some aspects described herein relate to a non-transitory computer-readable medium that stores a set of instructions for wireless communication by a base station. The set of instructions, when executed by one or more processors of the base station, may cause the base station to identify a helper UE to assist with retransmission of one or more sidelink communications, to be transmitted by a source UE to a destination UE, using a single-frequency network. The set of instructions, when executed by one or more processors of the base station, may cause the base station to transmit, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE.

Some aspects described herein relate to an apparatus for wireless communication. The apparatus may include means for receiving, from a base station, a signaling message requesting the apparatus to monitor for and transmit a sidelink communication in a manner that uses a single-frequency network, wherein the sidelink communication is to be transmitted by a source UE to a destination UE that is different from the apparatus. The apparatus may include means for receiving the sidelink communication, transmitted by the source UE to the destination UE, in a first time-frequency resource of the single-frequency network. The apparatus may include means for transmitting the sidelink communication in a second time-frequency resource of the single-frequency network, wherein the second time-frequency resource is indicated to the apparatus by the base station.

Some aspects described herein relate to an apparatus for wireless communication. The apparatus may include means for receiving, from a base station, a signaling message indicating that a helper UE is to monitor for and transmit a sidelink communication, to be transmitted by the apparatus to a destination UE, in a manner that uses a single-frequency network. The apparatus may include means for transmitting the sidelink communication to the destination UE in a first time-frequency resource of the single-frequency network based at least in part on receiving the signaling message. The apparatus may include means for retransmitting the sidelink communication in a second time-frequency resource of the single-frequency network, wherein the second time-frequency resource is indicated to the helper UE by the base station.

Some aspects described herein relate to an apparatus for wireless communication. The apparatus may include means for identifying a helper UE to assist with retransmission of one or more sidelink communications, to be transmitted by a source UE to a destination UE, using a single-frequency network. The apparatus may include means for transmitting, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE.

Aspects generally include a method, apparatus, system, computer program product, non-transitory computer-readable medium, user equipment, helper user equipment, source user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
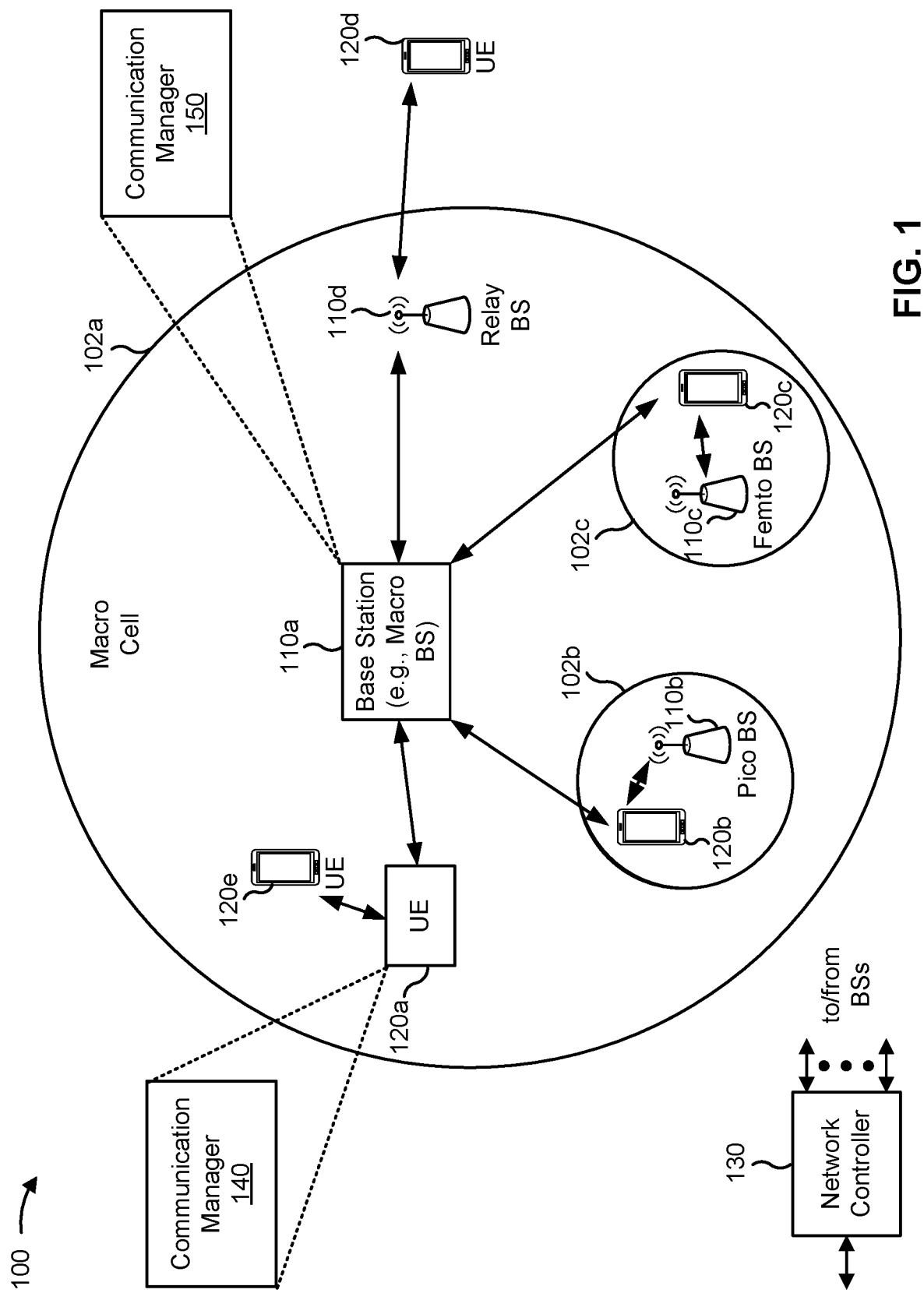
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a helper UE may include a communication manager 140. As described in more detail elsewhere herein, the communication manager 140 may receive, from a base station, a signaling message requesting the helper UE to monitor for and transmit a sidelink communication in a manner that uses a single-frequency network, wherein the sidelink communication is to be transmitted by a source UE to a destination UE that is different from the helper UE; receive the sidelink communication, transmitted by the source UE to the destination UE, in a first time-frequency resource of the single-frequency network; and transmit the sidelink communication in a second time-frequency resource of the single-frequency network, wherein the second time-frequency resource is indicated to the helper UE by the base station. Additionally, or alternatively, the communication manager 140 of the helper UE may perform one or more other operations described herein in connection with the helper UE.

In some aspects, a source UE may include a communication manager 140. As described in more detail elsewhere herein, the communication manager 140 may receive, from a base station, a signaling message indicating that a helper UE is to monitor for and transmit a sidelink communication, to be transmitted by the source UE to a destination UE, in a manner that uses a single-frequency network; and transmit the sidelink communication to the destination UE in a first time-frequency resource of the single-frequency network based at least in part on receiving the signaling message; and retransmit the sidelink communication in a second time-frequency resource of the single-frequency network, wherein the second time-frequency resource is indicated to the helper UE by the base station. Additionally, or alternatively, the communication manager 140 of the source UE may perform one or more other operations described herein in connection with the source UE. In some aspects, a UE 120 may act as a helper UE, a source UE, or both a helper UE and a source UE.

In some aspects, the base station 110 may include a communication manager 150. As described in more detail elsewhere herein, the communication manager 150 may identify a helper UE to assist with retransmission of one or more sidelink communications, to be transmitted by a source UE to a destination UE, using a single-frequency network; and transmit, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE. Additionally, or alternatively, the communication manager 150 may perform one or more other operations described herein.

As indicated above, FIG. 1 is provided as an example. Other examples may differ from what is described with regard to FIG. 1.

Figure 2:
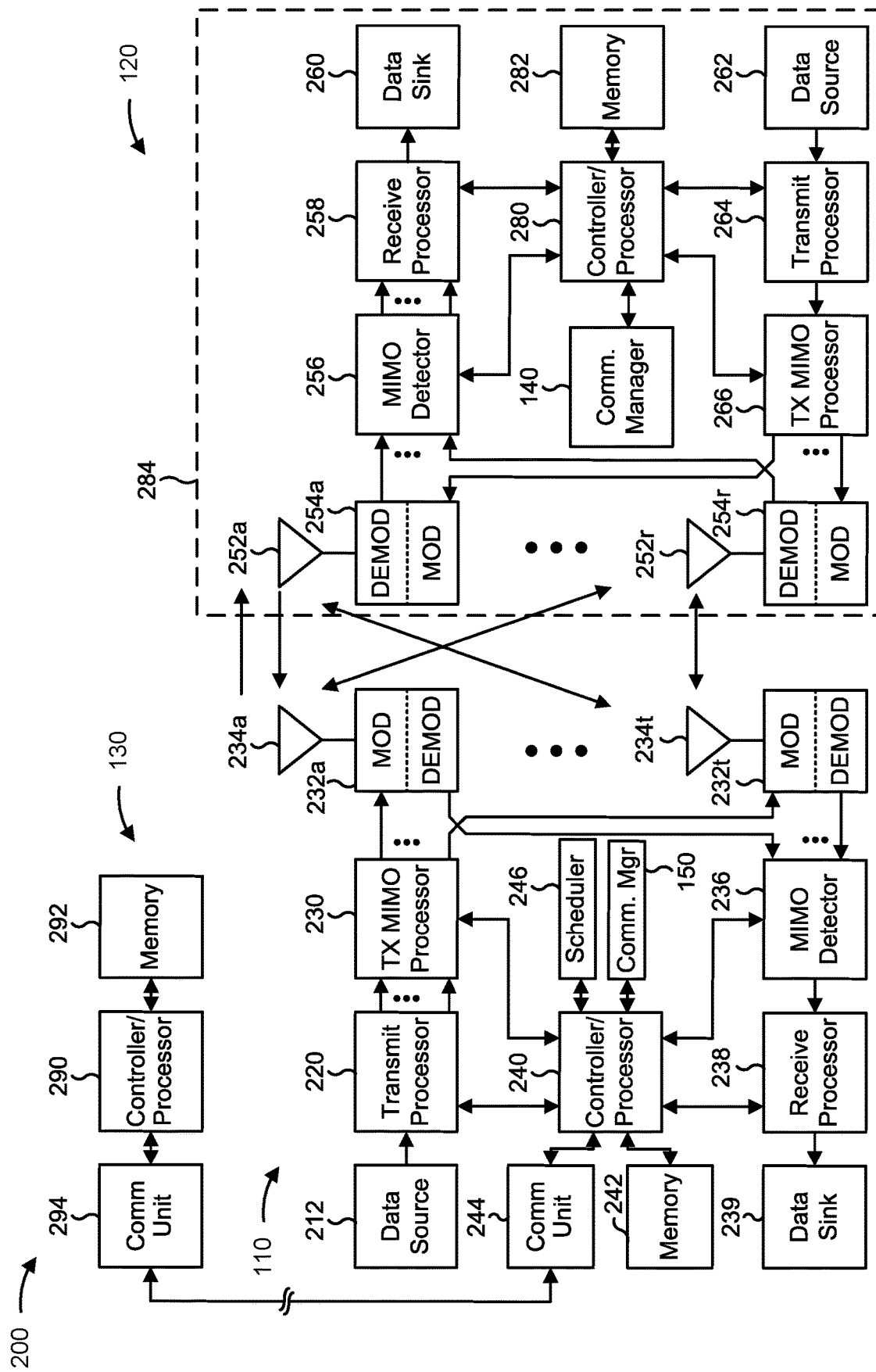
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-17).

The controller/processor 240 of the base station 110, the controller/processor 280 of the UE 120, and/or any other component(s) of FIG. 2 may perform one or more techniques associated with retransmission of sidelink communications in a single-frequency network, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a helper UE (e.g., a UE 120) includes means for receiving, from a base station, a signaling message requesting the helper UE to monitor for and transmit a sidelink communication in a manner that uses a single-frequency network, wherein the sidelink communication is to be transmitted by a source UE to a destination UE that is different from the helper UE; means for receiving the sidelink communication, transmitted by the source UE to the destination UE, in a first time-frequency resource of the single-frequency network; and/or means for transmitting the sidelink communication in a second time-frequency resource of the single-frequency network, wherein the second time-frequency resource is indicated to the helper UE by the base station. The means for the helper UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a source UE (e.g., a UE 120) includes means for receiving, from a base station, a signaling message indicating that a helper UE is to monitor for and transmit a sidelink communication, to be transmitted by the source UE to a destination UE, in a manner that uses a single-frequency network; and/or means for transmitting the sidelink communication to the destination UE in a first time-frequency resource of the single-frequency network based at least in part on receiving the signaling message; and/or means for retransmitting the sidelink communication in a second time-frequency resource of the single-frequency network, wherein the second time-frequency resource is indicated to the helper UE by the base station. The means for the source UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for identifying a helper UE to assist with retransmission of one or more sidelink communications, to be transmitted by a source UE to a destination UE, using a single-frequency network; and/or means for transmitting, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
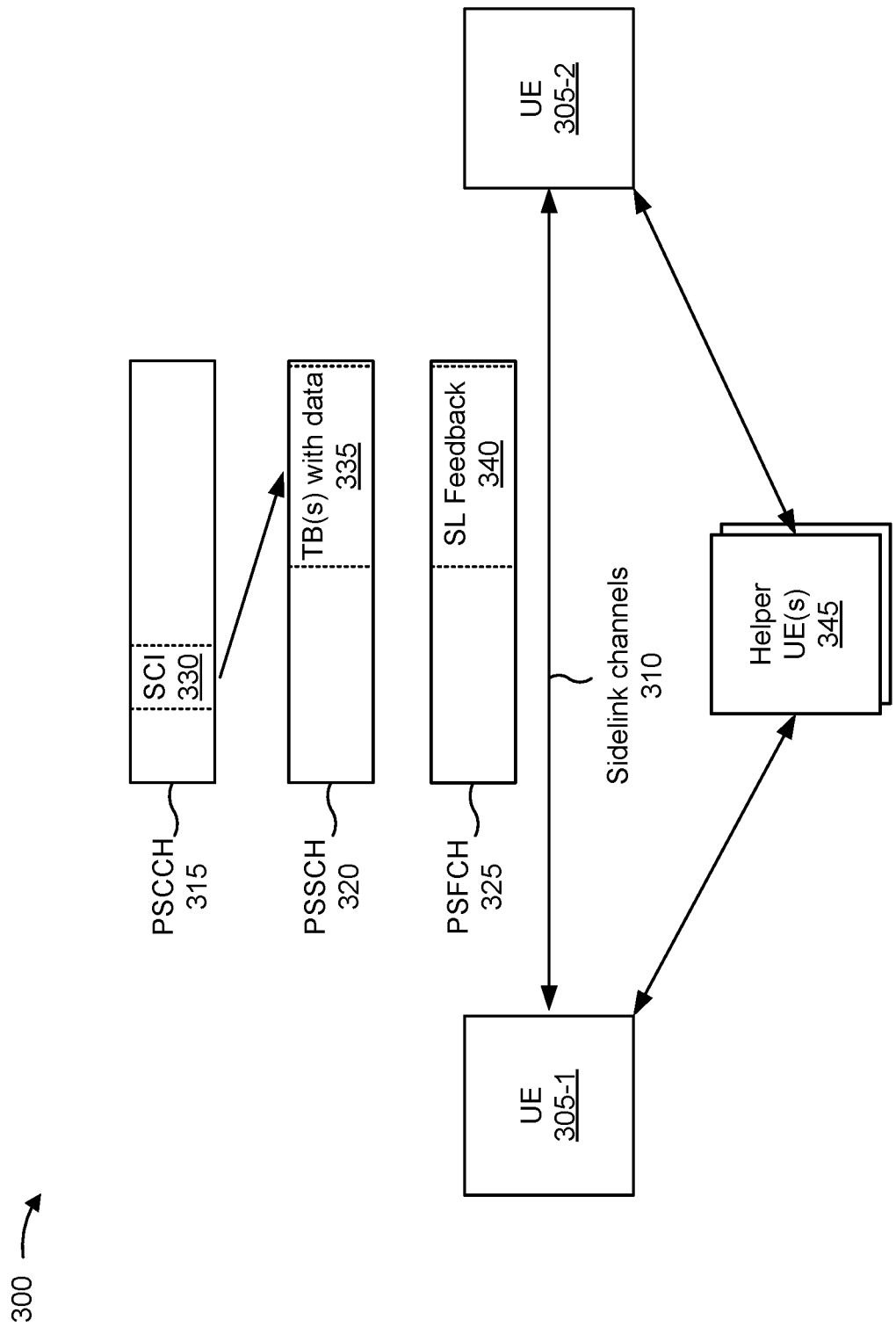
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a sidelink transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

For deployment of sidelink communications in high frequency bands (e.g., bands with frequencies above FR1, such as FR2, FR3, and/or FR4), beamforming alignment between a transmitter and receiver may be needed to enable communications with high quality and reliability due to propagation loss associated with high frequency bands. However, there is no dedicated sidelink reference signal to assist with beamforming alignment between sidelink UEs. For example, there is no sidelink reference signal similar to a channel state information reference signal (CSI-RS) used for beamforming alignment on an access link between a UE and a base station. As a result, beamforming alignment on the sidelink is a resource intensive process that requires consumption of UE processing resources and network resources.

Some techniques and apparatuses described herein enable a helper UE 345 to receive a sidelink communication, transmitted by a source UE to a destination UE, and transmit (or retransmit) that sidelink communication to the destination UE in a manner that uses a single-frequency network (SFN) (e.g., in an SFN manner). This may improve reliability and likelihood of successful reception of the sidelink communication by the destination UE. In some examples, the helper UE 345 may have previously performed beamforming alignment with the destination UE, further increasing the likelihood of successful reception of the sidelink communication by the destination UE and reducing the need for the source UE and the destination UE to perform beamforming alignment with one another. In some examples, spatial diversity may be improved by transmission of the sidelink communication to the destination UE using multiple beams (e.g., one beam from the source UE and another beam from the helper UE 345).

Furthermore, some techniques and apparatuses described herein enable reduced latency and increased flexibility for helper UE transmissions by using DCI to schedule helper UE transmissions, as compared to using configured grants or periodic transmissions by the helper UE 345. Furthermore, some techniques and apparatuses described herein use a base station (e.g., in a Mode 1 sidelink transmission mode) to assist with identifying one or more helper UEs 345 and/or coordinating SFN communications among helper UEs 345 and/or among a source UE and one or more helper UEs 345 in an SFN manner. This may reduce interference compared to an example where UEs autonomously act as helper UEs, which may result in a large volume of network traffic (e.g., a "broadcasting storm") as compared to a base station selecting the best helper UEs.

As indicated above, FIG. 3 is provided as an example. Other examples may differ from what is described with respect to FIG. 3.

Figure 4:
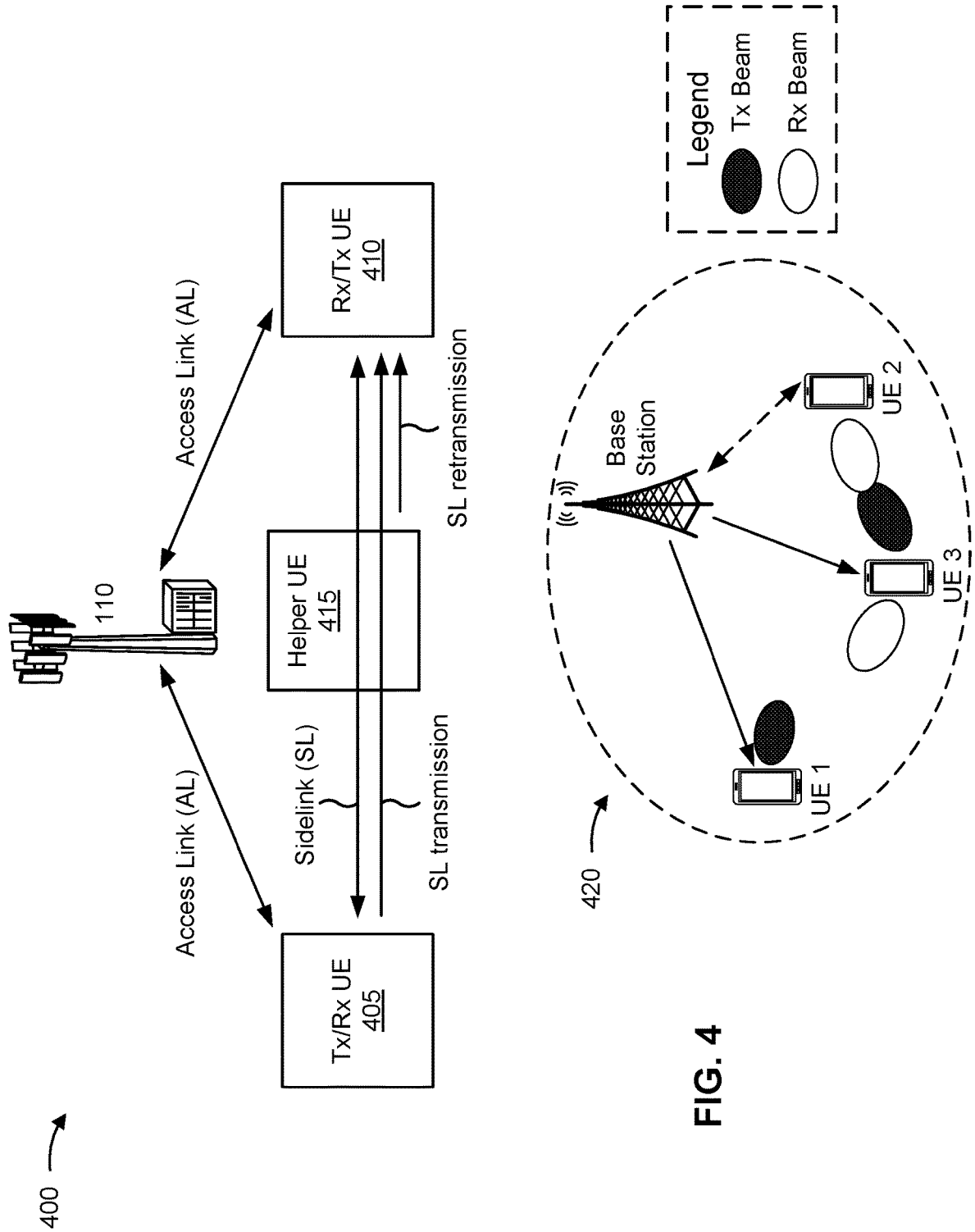
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As shown by reference number 420, a source UE, shown as UE 1, may transmit a sidelink communication to a destination UE, shown as UE 2. The source UE may be in communication with a base station (e.g., base station 110) via an access link, and the destination UE may or may not be in communication with the base station. In some aspects, the source UE may correspond to Tx/Rx UE 405, and the destination UE may correspond to Rx/Tx UE 410. As further shown, the source UE and the destination UE may be separated by a large distance and/or may have a poor link between each other.

Some techniques and apparatuses described herein enable a helper UE, shown as UE 3 (which may correspond to helper UE 415) to receive a sidelink communication, transmitted by the source UE to the destination UE, and to transmit (or retransmit) that sidelink communication to the destination UE in a manner that uses an SFN (e.g., in an SFN manner). This may improve reliability and likelihood of successful reception of the sidelink communication by the destination UE, particularly when the source UE and the destination UE may be separated by a large distance and/or may have a poor link between each other. In some examples, the term "retransmission" may be used to refer to a transmission, by the helper UE, of a sidelink communication, received from the source UE, to the destination UE. The term "retransmission" may refer to an initial transmission of this sidelink communication by the helper UE, which is "retransmitting" the sidelink communication initially transmitted by the source UE.

As indicated above, FIG. 4 is provided as an example. Other examples may differ from what is described with respect to FIG. 4.

Figure 5:
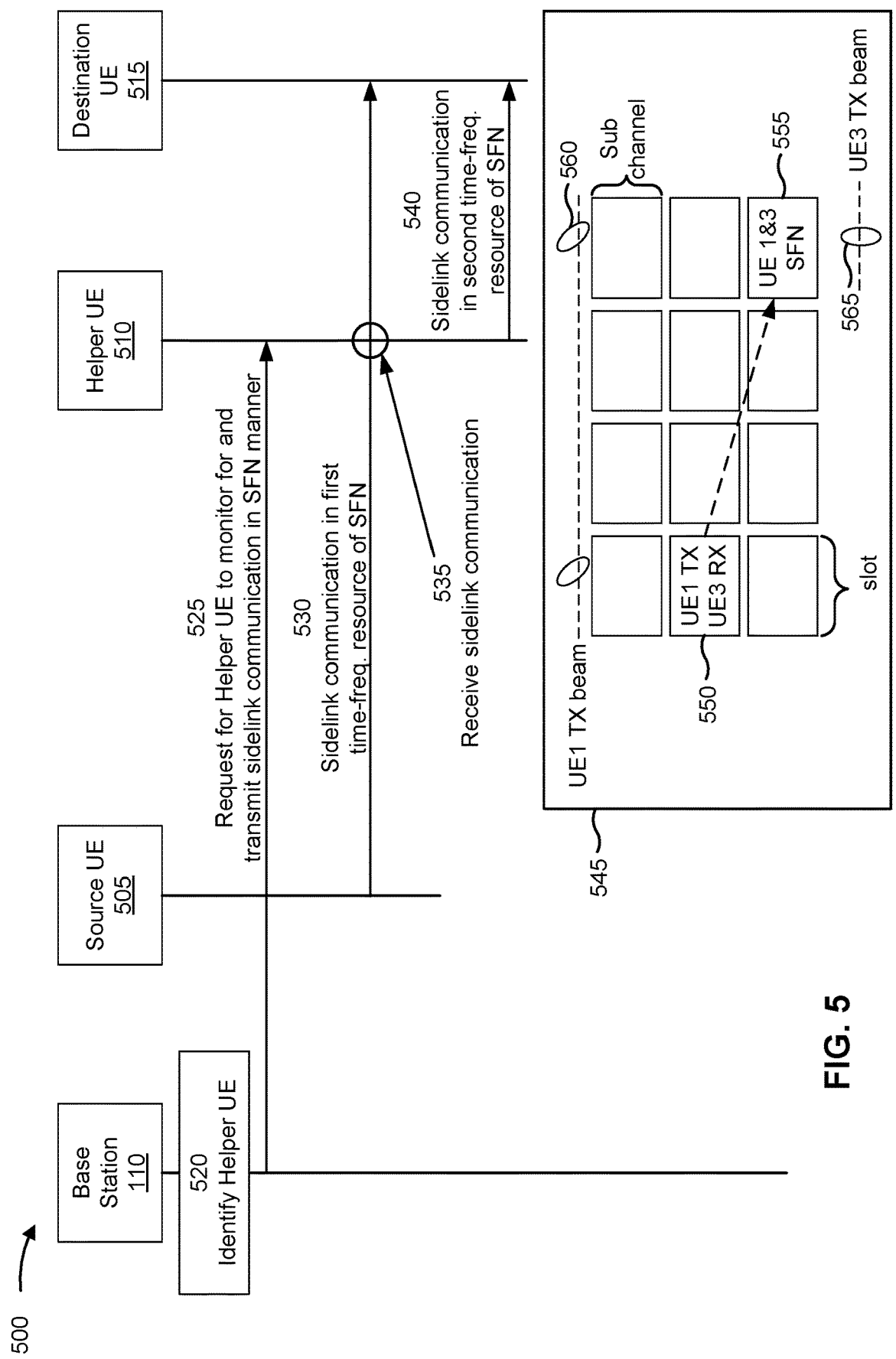
FIGS. 5-11 are diagrams illustrating examples associated with retransmission of sidelink communications in a single-frequency network, in accordance with the present disclosure.

FIG. 5 is a diagram illustrating an example 500 associated with retransmission of sidelink communications in a single-frequency network, in accordance with the present disclosure. As shown in FIG. 5, two or more of a base station 110, a source UE 505, a helper UE 510, and/or a destination UE 515 may communicate with one another. The source UE 505, the helper UE 510, and the destination UE 515 are example of UEs 120 capable of sidelink communication.

Figure 17:
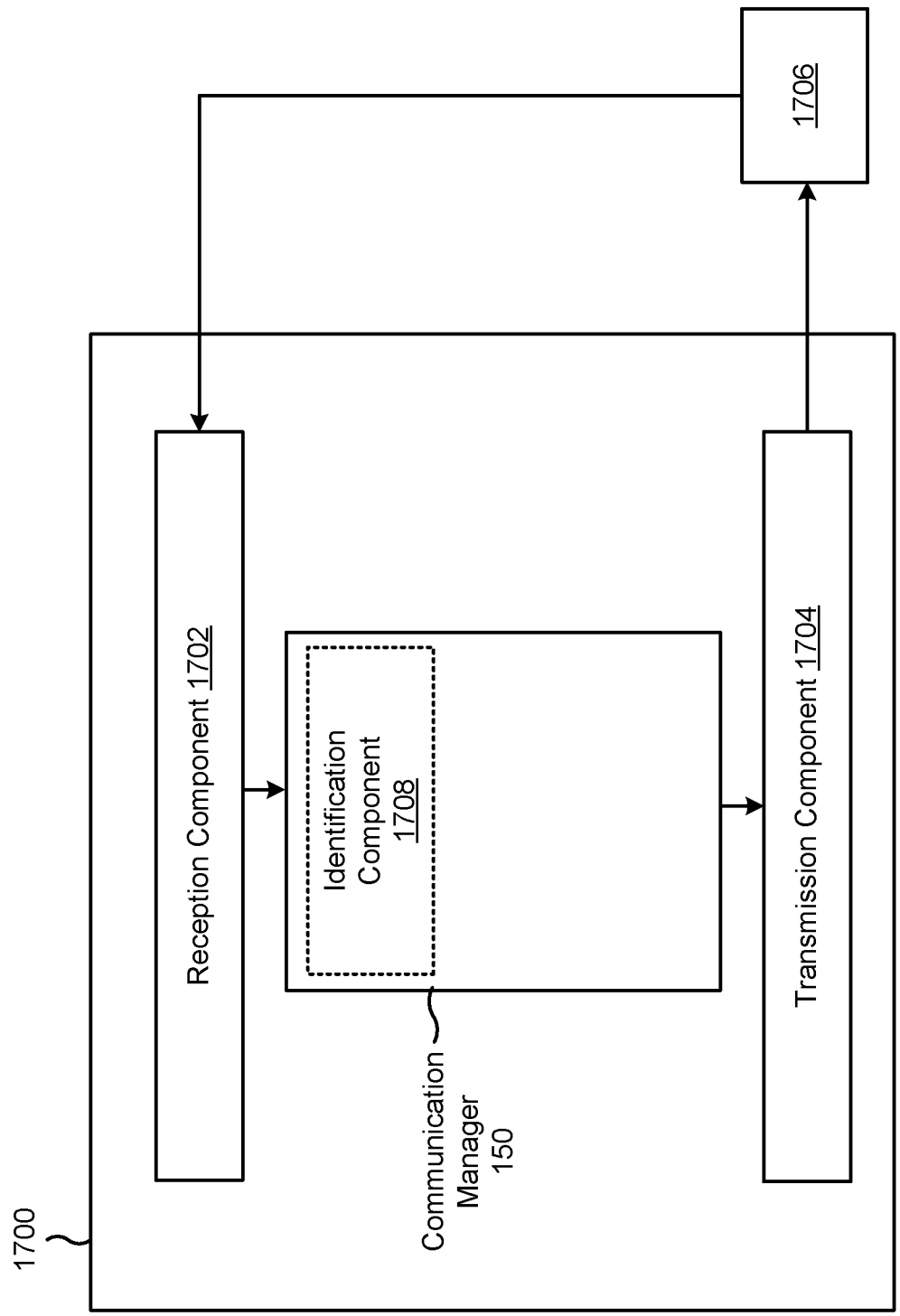

As shown by reference number 520, the base station 110 may identify (e.g., using communication manager 150 and/or identification component 1708, shown in FIG. 17) one or more helper UEs. For example, the base station 110 may identify one or more helper UEs to assist with retransmission of one or more sidelink communications, to be transmitted by the source UE 505 to the destination UE 515, using a single-frequency network. The one or more helper UEs may include the helper UE 510. In some aspects, the base station 110 may identify the helper UE 510 based at least in part on receiving a triggering message from the source UE 505, as described in more detail elsewhere herein.

In some aspects, the base station 110 may receive (e.g., using reception component 1702, shown in FIG. 17) information from UEs in a vicinity of the base station 110 (e.g., UEs served by the base station 110 and/or in a coverage area of the base station 110), and may use that information to identify helper UEs. For example, the base station 110 may use information indicating a distance between, a signal quality between, and/or beam alignment between a potential helper UE and the source UE 505 and/or the destination UE 515 to determine whether the potential helper UE should be identified as a helper UE. For example, the base station 110 may favor UEs that are closer to the source UE 505 and/or the destination UE 515 when selecting one or more helper UEs. Additionally, or alternatively, the base station 110 may favor UEs that have good signal quality with the source UE 505 and/or the destination UE 515 when selecting one or more helper UEs. Additionally, or alternatively, the base station 110 may favor UEs that have beam alignment with the source UE 505 and/or the destination UE 515 when selecting one or more helper UEs. In some aspects, the base station 110 may store, in memory of the base station 110, a graph (e.g., a conflicting graph) of relationships between UEs to assist with identifying UEs that are to act as helper UEs. In this way, the base station 110 may select helper UE(s) that are most likely to assist with successful reception of a sidelink communication by the destination UE 515 while avoiding interference that would result from use of a large number of helper UEs.

As shown by reference number 525, the base station 110 may transmit (e.g., using transmission component 1704, shown in FIG. 17), and the helper UE 510 may receive (e.g., using reception component 1502, shown in FIG. 15), a request for the helper UE 510 to monitor for and transmit a sidelink communication in a manner that uses a single-frequency network (e.g., in an SFN manner). The sidelink communication may be a communication that is to be transmitted by the source UE 505 to the destination UE 515 (e.g., the destination UE 515 is different from the helper UE 510). In some aspects, the request may be included in a signaling message from the base station 110 to the helper UE 510, such as a DCI message, a group common (GC) PDCCH (GC-PDCCH) message, and/or a configuration message (e.g., an RRC message). In some aspects, the configuration message may configure periodic sidelink communications for the helper UE 510.

In an example where the request is included in a GC-PDCCH message, the GC-PDCCH message may indicate whether one or more UEs, in a group of UEs that includes the helper UE 510, are to monitor for and transmit one or more sidelink communications using the SFN. For example, the GC-PDCCH may include a bitmap, and each bit in the bitmap may correspond to a UE in the group of UEs. A first value (e.g., 1) for a bit may indicate that the corresponding UE is to act as a helper UE (e.g., is to perform operations described herein as being performed by the helper UE 510), while a second value (e.g., 0) for the bit may indicate that the corresponding UE is not to act as a helper UE (e.g., is not to monitor for and retransmit sidelink communications). In some aspects, the GC-PDCCH may indicate multiple UEs that are to participate as helper UEs in an SFN retransmission of a sidelink communication transmitted by the source UE 505 to the destination UE 515.

Additionally, or alternatively, the GC-PDCCH may indicate one or more conditions for a potential helper UE, in the group of UEs, to act as helper UEs in an SFN retransmission of a sidelink communication transmitted by the source UE 505 to the destination UE 515. The one or more conditions may include, for example, a condition associated with a distance between a potential helper UE and the source UE 505 (e.g., a condition that the distance is less than or equal to a threshold), a condition associated with a distance between a potential helper UE and the destination UE 515 (e.g., a condition that the distance is less than or equal to a threshold), a condition that the potential helper UE has beam alignment with (e.g., has performed a beam alignment procedure with) the destination UE 515, and/or a condition that the potential helper UE has communicated with the destination UE 515 (e.g., within a threshold time period). In some aspects, the base station 110 may transmit a message (e.g., a configuration message, an RRC message, and/or a system information block (SIB)) that indicates a mapping between a set of index values and corresponding conditions, and the GC-PDCCH may include an index value that indicates a particular set of conditions. Alternatively, the mapping between a set of index values and corresponding conditions may be specified according to a wireless communication standard.

In some aspects, if a potential helper UE satisfies the set of conditions, then the potential helper UE may act as a helper UE for SFN retransmission of a sidelink communication. In some aspects, if the GC-PDCCH indicates a first value (e.g., 1) for the potential helper UE, and the potential helper UE satisfies the set of conditions, then the potential helper UE may act as a helper UE. As another example, if the GC-PDCCH indicates a first value (e.g., 1) for the potential helper UE, and the potential helper UE does not satisfy the set of conditions, then the potential helper UE may refrain from acting as a helper UE. As another example, if the GC-PDCCH indicates a second value (e.g., 0) for the potential helper UE, then the potential helper UE may refrain from acting as a helper UE regardless of whether the potential helper UE satisfies the set of conditions.

The request may include information to assist the helper UE 510 with receiving and/or transmitting the sidelink communication, as described elsewhere herein. For example, the request may indicate a first time-frequency resource (of the SFN) in which the helper UE 510 is to monitor for and/or receive the sidelink communication transmitted by the source UE 505, a second time-frequency resource (of the SFN) in which the helper UE 510 is to transmit the sidelink communication (e.g., to the destination UE 515), one or more transmission parameters to be used by the helper UE 510 to construct and/or transmit the sidelink communication, a source UE identifier (e.g., a layer 2 source UE identifier) associated with the source UE 505, a destination UE identifier (e.g., a layer 2 destination UE identifier) associated with the destination UE 515, a receive beam to be used by the helper UE 510 to receive the sidelink communication from the source UE 505, a set of receive beams to be used by the helper UE 510 to attempt to receive the sidelink communication from the source UE 505 (e.g., using beam-sweeping), a transmit beam to be used by the helper UE 510 to transmit the sidelink communication, and/or a set of transmit beams to be used by the helper UE 510 to transmit the sidelink communication (e.g., using beam-sweeping).

A first transmission that is transmitted in an "SFN manner" or that "uses an SFN" may be transmitted in a same time-frequency resource as a second transmission, where the first transmission and the second transmissions are both transmitted over the same (e.g., a single) frequency channel. In an SFN, multiple transmitters are configured and/or scheduled to transmit a signal (e.g., the same signal or the same communication) using the same frequency channel, which increases the likelihood of successful reception by the receiver. For example, if one of the transmissions of a signal is blocked or experiences signal degradation, the receiver may still receive one or more other transmissions of the signal. Additionally, or alternatively, the receiver may combine multiple signals (e.g., communications or transmissions), received in the same time-frequency resource, to improve decoding accuracy. Additionally, or alternatively, multiple signals, transmitted in the same time-frequency resource, can combine to improve signal quality. As used herein, the term "communication" can be used interchangeably with "signal."

As shown by reference number 530, the source UE 505 may transmit (e.g., using transmission component 1604, shown in FIG. 16) a sidelink communication to the destination UE 515 in a first time-frequency resource of the SFN. A "time-frequency resource" may refer to a particular resource in the time domain (e.g., a slot, a mini-slot, or a set of symbols) and in the frequency domain (e.g., a channel or a sub-channel). An RB is an example of a time-frequency resource. The sidelink communication may include, for example, a PSSCH communication or a PSCCH communication.

As shown by reference number 535, the helper UE 510 may receive (e.g., using reception component 1502, shown in FIG. 15) the sidelink communication in the first time-frequency resource of the SFN. In some aspects, the request, received by the helper UE 510 from the base station 110, may indicate the first time-frequency resource to be used by the helper UE 510 for reception of the sidelink communication, and the helper UE 510 may monitor the first time-frequency resource for the sidelink communication based at least in part on this indication. In this way, the helper UE conserves battery power and processing power as compared to a scenario where the helper UE is always monitoring for sidelink communications. In some aspects, the request may indicate more than two time-frequency resources of the SFN, as described in more detail in connection with FIG. 9. In some aspects, the request may indicate a monitoring window to be monitored by the helper UE 510 for the sidelink communication, as described in more detail in connection with FIG. 10. In some aspects, the request may indicate one or more receive beams to be used by the helper UE 510 to receive and/or attempt to receive the sidelink communication transmitted by the source UE 505. In this example, the helper UE 510 may attempt to receive the sidelink communication using the one or more receive beams (e.g., using a single receive beam or using beam-sweeping for multiple receive beams).

As shown by reference number 540, the helper UE 510 may transmit (e.g., using transmission component 1504, shown in FIG. 15) the sidelink communication in a second time-frequency resource of the SFN. In some aspects, the request, received by the helper UE 510 from the base station 110, may indicate the second time-frequency resource to be used by the helper UE 510 for transmission of the sidelink communication, and the helper UE 510 may transmit the sidelink communication in the second time-frequency resource based at least in part on this indication. In some aspects, the request may indicate more than two time-frequency resources of the SFN, as described in more detail in connection with FIG. 9. In some aspects, the request may indicate one or more transmit beams to be used by the helper UE 510 to transmit the sidelink communication. In this example, the helper UE 510 may transmit the sidelink communication using the one or more transmit beams (e.g., using a single transmit beam or using beam-sweeping for multiple transmit beams). Additionally, or alternatively, the helper UE 510 may determine a transmit beam to be used based at least in part on performing a beam alignment procedure with the destination UE 515.

To ensure an SFN transmission, the helper UE 510 may need to transmit the sidelink communication using the same waveform as is used by another UE (e.g., the source UE 505 or another helper UE) that also transmits the sidelink communication in the second time-frequency resource. Thus, the helper UE 510 may transmit the sidelink communication in the second time-frequency resource using a same waveform that was used for reception of the sidelink communication by the helper UE 510 in the first time-frequency resource. In this example, if the source UE 505 retransmits the sidelink communication in the second time-frequency resource, then the source UE 505 may retransmit the sidelink communication in the second time-frequency resource using a same waveform that was used for transmission of the sidelink communication by the source UE 505 in the first time-frequency resource. This reduces destructive interference and enhances constructive interference to improve signal quality of the sidelink communication. For example, multiple transmissions of the same signal (e.g., the same sidelink signal) in the same time-frequency resource boost the overall energy of the signal (e.g., two UEs transmitting the same signal at 23 dBm create a signal with 26 dBm). Furthermore, the same signal may be transmitted via different paths (e.g., in different spatial directions) by different UEs, which increases the spatial diversity gain of the resulting signal. Furthermore, for sidelink communications that use a CP-OFDM waveform, the signal energy can be easily combined by the receiver.

In some aspects, the helper UE 510 constructs the sidelink communication, to be transmitted in the second time-frequency resource, based at least in part on a first transmission parameter indicated in the request from the base station 110 (e.g., in a signaling message received from the base station 110) and a second transmission parameter determined from the sidelink communication received in the first time-frequency resource. A transmission parameter may include, for example, an MCS to be used for a transmission, a sidelink process identifier to be used for the transmission, a redundancy version (RV) to be used for the transmission, and/or a transport block size to be used for the transmission. For example, the helper UE 510 may use an RV indicated in the request from the base station 110 to construct the sidelink communication to be transmitted by the helper UE 510. Thus, in some aspects, the sidelink communication received by the helper UE 510 and the sidelink communication transmitted by the helper UE 510 may be different redundancy versions of the same sidelink communication. Additionally, or alternatively, the helper UE 510 may use an MCS and/or a sidelink process identifier, indicated by and/or used for the sidelink communication received by the helper UE 510 in the first time-frequency resource, to transmit the sidelink communication in the second time-frequency resource. In some aspects, rather than embedding a helper UE identifier (e.g., a layer 2 helper UE identifier), associated with the helper UE 510, in the sidelink communication, the helper UE 510 may use a source UE identifier (e.g., a layer 2 source UE identifier), included in the sidelink communication received by the helper UE 510, to construct the sidelink communication to be transmitted by the helper UE 510.

In some aspects, the second time-frequency resource is the same time-frequency resource used by another UE to transmit the sidelink communication, such that the sidelink communication is transmitted in an SFN manner. As an example, and as shown by reference number 545, the source UE 505 (shown as UE1) may transmit (e.g., using transmission component 1604, shown in FIG. 16) a sidelink communication to the destination UE 515 (such as UE2, not shown) in a first time-frequency resource 550, and the helper UE 510 (shown as UE3) may receive (e.g., using reception component 1502, shown in FIG. 15) the sidelink communication in the first time-frequency resource 550. The helper UE 510 and the source UE 505 may then both transmit (e.g., using transmission component 1504, shown in FIG. 15, and transmission component 1604, shown in FIG. 16, respectively) the sidelink communication in a second time-frequency resource 555. As shown, in some aspects, the helper UE 510 may use a different beam than the source UE 505 for the transmission in the second time-frequency resource 555. For example, the source UE 505 may use a first beam 560 for transmission of the sidelink communication in the second time-frequency resource 555, and the helper UE 510 may use a second beam 565 (e.g., in a different spatial direction) for transmission of the sidelink communication in the second time-frequency resource 555.

In this example, the source UE 505 and the helper UE 510 each transmit the sidelink communication in the second time-frequency resource 555 in an SFN manner. In some aspects, one or more additional UEs (e.g., one or more additional helper UEs) may also transmit the sidelink communication in the second time-frequency resource 555 in an SFN manner, in a similar manner as described herein in connection with the helper UE 510. Alternatively, the source UE 505 may not transmit the sidelink communication in the second time-frequency resource 555. Rather, multiple helper UEs (e.g., including the helper UE 510) may transmit the sidelink communication in the second time-frequency resource in an SFN manner. Thus, the second time-frequency resource, in which the helper UE 510 transmits the sidelink communication, may be the same time-frequency resource as is indicated by the base station 110 to the source UE 505 or another helper UE for transmission (or retransmission) of the sidelink communication (e.g., a retransmission by the source UE or an initial transmission by a helper UE).

In some aspects, the helper UE 510 may validate the sidelink communication received in the first time-frequency resource prior to transmitting the sidelink communication in the second time-frequency resource. For example, the base station 110 may indicate (e.g., in the request transmitted to the helper UE 510) a source UE identifier that identifies the source UE 505 and/or a destination UE identifier that identifies the destination UE 515 (e.g., may indicate only the source UE identifier, may indicate only the destination UE identifier, or may indicate both the source UE identifier and the destination UE identifier). When the helper UE 510 receives the sidelink communication in the first time-frequency resource, the helper UE 510 may read the sidelink communication to determine whether the source UE identifier and/or the destination UE identifier is included in the sidelink communication. If the source UE identifier and/or the destination UE identifier is included in the sidelink communication received by the helper UE 510 in the first time-frequency resource, then the helper UE 510 may transmit the sidelink communication in the second time-frequency resource. If the source UE identifier and/or the destination UE identifier is not included in the sidelink communication received by the helper UE 510 in the first time-frequency resource (e.g., due to a failure by the source UE 505 to access the channel and/or a poor link between the source UE 505 and the helper UE 510), then the helper UE 510 may refrain from transmitting the sidelink communication in the second time-frequency resource.

In this way, techniques and apparatuses described herein enable the helper UE 510 to receive a sidelink communication, transmitted by the source UE 505 to the destination UE 515, and transmit (or retransmit) that sidelink communication to the destination UE 515 in an SFN manner. This may improve reliability and likelihood of successful reception of the sidelink communication by the destination UE 515. By using the base station 110 to control, coordinate, and/or schedule transmissions of the sidelink communication in an SFN manner, interference may be reduced as compared to a scenario where a large number of UEs act as helper UEs due to lack of control, coordination, and/or scheduling by a base station.

As indicated above, FIG. 5 is provided as an example. Other examples may differ from what is described with respect to FIG. 5.

Figure 6:
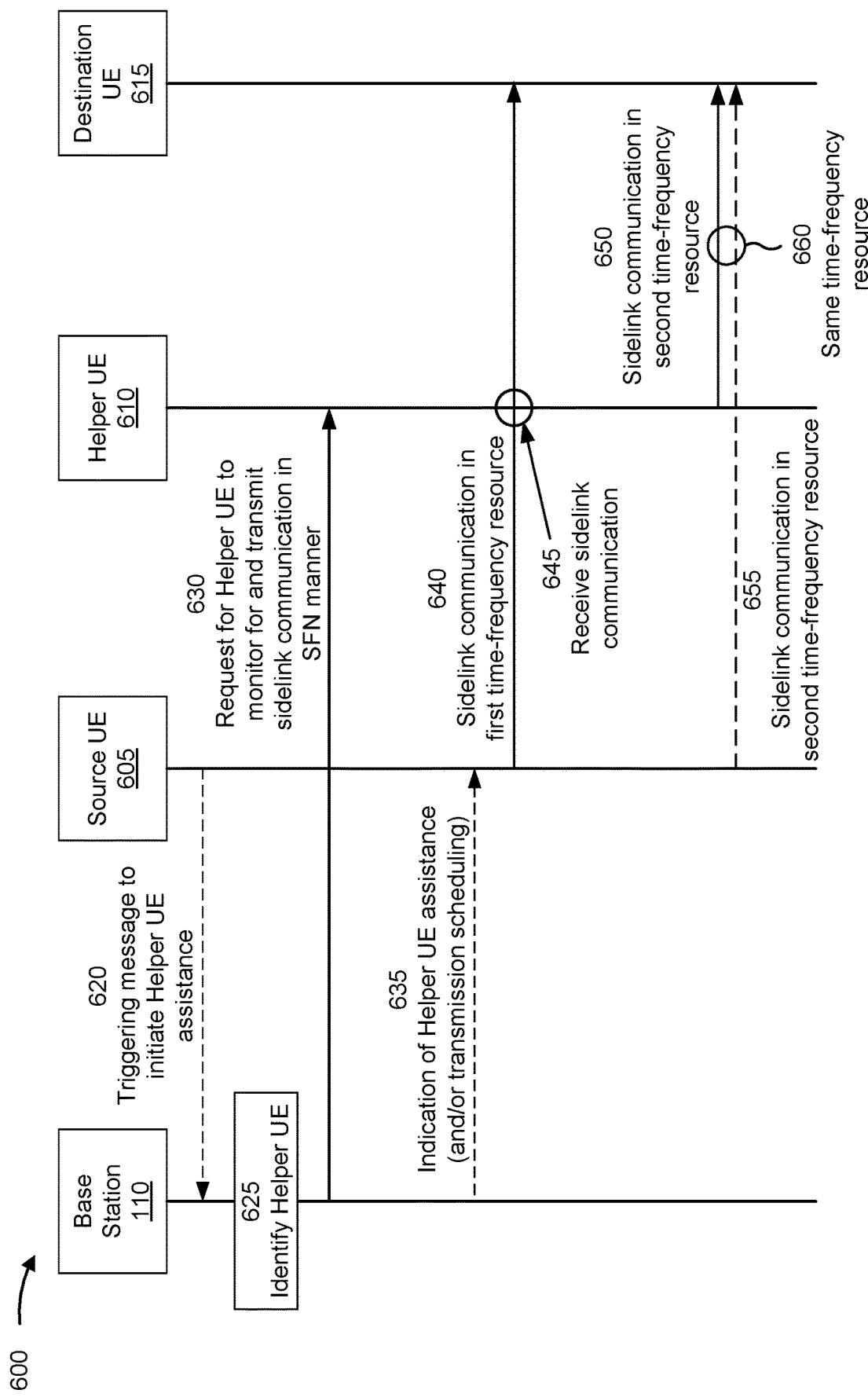

FIG. 6 is a diagram illustrating an example 600 associated with retransmission of sidelink communications in a single-frequency network, in accordance with the present disclosure. As shown in FIG. 6, two or more of a base station 110, a source UE 605, a helper UE 610, and/or a destination UE 615 may communicate with one another. The source UE 605, the helper UE 610, and the destination UE 615 are example of UEs 120 capable of sidelink communication, and may correspond to the source UE 505, the helper UE 510, and the destination UE 515 of FIG. 5, respectively.

As shown by reference number 620, the source UE 605 may transmit (e.g., using transmission component 1604, shown in FIG. 16), and the base station 110 may receive (e.g., using reception component 1702, shown in FIG. 17), an indication (shown as a "triggering message") to initiate assistance, by one or more helper UEs 610, with retransmission of one or more sidelink communications transmitted by the source UE 605. For example, the triggering message may trigger the base station 110 to identify one or more helper UEs 610 that are to monitor for and transmit the one or more sidelink communications. Additionally, or alternatively, the triggering message may trigger the base station 110 to request one or more helper UEs 610 (e.g., previously identified by the base station 110) to monitor for and transmit the one or more sidelink communications. In some aspects, the triggering message is a buffer status report (BSR). Additionally, or alternatively, the triggering message may be included in a medium access control (MAC) control element (CE) (MAC-CE) (e.g., on the PUSCH).

In some aspects, the triggering message includes a request for the base station 110 to identify and/or request assistance, by one or more helper UEs 610, with retransmission of one or more sidelink communications transmitted by the source UE 605. For example, the triggering message may indicate that the source UE 605 has a poor link (e.g., with poor channel conditions, a large distance, and/or non-aligned beams) with a destination UE 615 to which the source UE 605 is to transmit a sidelink communication. In some aspects, the triggering message may indicate the destination UE 615 to which the source UE 605 is to transmit the sidelink communication, such as by using a destination UE identifier of the destination UE 615. This may assist the base station 110 with identifying appropriate helper UE(s) 610 to retransmit the sidelink communication.

As shown by reference number 625, the base station 110 may identify (e.g., using communication manager 150 and/or identification component 1708, shown in FIG. 17) one or more helper UEs, as described above in connection with reference number 520 of FIG. 5. For example, the base station 110 may identify one or more helper UEs to assist with retransmission of one or more sidelink communications, to be transmitted by the source UE 605 to the destination UE 615, using a single-frequency network. The one or more helper UEs may include the helper UE 610. In some aspects, the base station 110 may identify the helper UE 610 based at least in part on receiving a triggering message from the source UE 605. For example, the triggering message may cause the base station 110 to identify one or more helper UEs, and/or the base station 110 may use information in the triggering message to identify the one or more helper UEs. Alternatively, the base station 110 may identify one or more helper UEs without first receiving the triggering message from the source UE 605 (e.g., as indicated by the dashed line shown in connection with reference number 620).

In some aspects, the base station 110 may identify one or more helper UEs that are well suited to assist with retransmission from the source UE 605, from which the triggering message is received, and/or to the destination UE 615, which may be identified in the triggering message. For example, the base station 110 may select UEs that are closer to the source UE 605 and/or the destination UE 615 (as compared to UEs that are farther from the source UE 605 and/or the destination UE 615) when identifying the one or more helper UEs. Additionally, or alternatively, the base station 110 may select UEs that have good signal quality with the source UE 605 and/or the destination UE 615 (as compared to UEs that have poor signal quality with the source UE 605 and/or the destination UE 615) when identifying the one or more helper UEs. Additionally, or alternatively, the base station 110 may select UEs that have beam alignment with the source UE 605 and/or the destination UE 615 (as compared to UEs that do not have beam alignment with the source UE 605 and/or the destination UE 615) when identifying the one or more helper UEs. In this way, the base station 110 may select helper UE(s) that are most likely to assist with successful reception of a sidelink communication by the destination UE 615 while avoiding interference that would result from use of a large number of helper UEs.

As shown by reference number 630, the base station 110 may transmit (e.g., using transmission component 1704, shown in FIG. 17), and the helper UE 610 may receive (e.g., using reception component 1502, shown in FIG. 15), a request for the helper UE 610 to monitor for and transmit a sidelink communication in a manner that uses a single-frequency network (e.g., in an SFN manner), as described above in connection with reference number 525 of FIG. 5. In some aspects, the base station 110 may transmit the request based at least in part on receiving the triggering message from the source UE 605. Thus, the source UE 605 may receive the request based at least in part on transmitting the triggering message to the base station 110.

As shown by reference number 635, the base station 110 may transmit (e.g., using transmission component 1704, shown in FIG. 17), and the source UE 605 may receive (e.g., using reception component 1602, shown in FIG. 16), an indication that a helper UE is to monitor for and transmit a sidelink communication, to be transmitted by the source UE 605 to the destination UE 615, in a manner that uses an SFN (e.g., in an SFN manner). In some aspects, the indication may be included in a signaling message, such as a DCI message. In some aspects, the indication may include scheduling information for one or more sidelink transmissions by the source UE 605. For example, the indication may indicate a first time-frequency resource to be used for a first transmission (e.g., an initial transmission or an earlier-occurring transmission) of the sidelink communication by the source UE 605 and/or a second time-frequency resource to be used for a second transmission (e.g., a retransmission or a later-occurring transmission) of the sidelink communication by the source UE 605.

In some aspects, the first time-frequency resource is the same time-frequency resource as is indicated by the base station 110 to the helper UE 610 (e.g., in the request described in connection with reference number 630) for reception of the sidelink communication by the helper UE 610. In some aspects, the second time-frequency resource is the same time-frequency resource as is indicated by the base station 110 to the helper UE 610 (e.g., in the request described in connection with reference number 630) for transmission of the sidelink communication by the helper UE 610 to the destination UE 615. As indicated by the dashed line shown in connection with reference number 635 (and as shown in FIG. 5), in some aspects, the base station 110 may not transmit this indication to the source UE 605. In such an example, the base station 110 may still indicate the first time-frequency resource (and/or the second time-frequency resource) to the source UE 605.

As shown by reference number 640, the source UE 605 may transmit (e.g., using transmission component 1604, shown in FIG. 16) a sidelink communication to the destination UE 615 in a first time-frequency resource of the SFN, as described above in connection with reference number 530 of FIG. 5. In some aspects, the source UE 605 may transmit the sidelink communication to the destination UE 615 in the first time-frequency resource based at least in part on receiving the indication (e.g., the signaling message) from the base station 110. For example, the indication may indicate the first time-frequency resource to be used by the source UE 605 for transmission of the sidelink communication to the destination UE 615. Additionally, or alternatively, the source UE 605 may use more aggressive rate control (e.g., a higher coding rate and/or a higher MCS) than the source UE 605 would otherwise use if the source UE 605 had not received the indication that a helper UE is to monitor for and transmit the sidelink communication. This may increase throughput without sacrificing reliability (e.g., because the lower reliability resulting from the more aggressive rate control may be offset by transmission of the sidelink communication by the helper UE 610). As shown by reference number 645, the helper UE 610 may receive (e.g., using reception component 1502, shown in FIG. 15) the sidelink communication in the first time-frequency resource of the SFN, as described above in connection with reference number 535 of FIG. 5.

As shown by reference number 650, the helper UE 610 may transmit (e.g., using transmission component 1504, shown in FIG. 15) the sidelink communication in a second time-frequency resource of the SFN, as described above in connection with reference number 540 of FIG. 5. As shown by reference number 655, in some aspects, the source UE 605 may also transmit (e.g., may retransmit or may transmit a retransmission of) the sidelink communication in the second time-frequency resource of the SFN (e.g., using transmission component 1604, shown in FIG. 16), as also described above in connection with reference number 540 of FIG. 5. Thus, as shown by reference number 660, the helper UE 610 and the source UE 605 may transmit the sidelink communication in the same time-frequency resource in an SFN manner, as described above in connection with reference number 540 of FIG. 5. As indicated by the dashed arrow in connection with reference number 655, in some aspects, the source UE 605 may not transmit the sidelink communication in the second time-frequency resource. Rather, an additional one or more helper UEs (e.g., in addition to the helper UE 610) may receive the sidelink communication from the source UE 605 (e.g., in the first time-frequency resource) and may transmit the sidelink communication in the second time-frequency resource in an SFN manner with the helper UE 610, as also described above in connection with reference number 540 of FIG. 5.

In this way, techniques and apparatuses described herein enable the helper UE 610 to receive a sidelink communication, transmitted by the source UE 605 to the destination UE 615, and transmit (or retransmit) that sidelink communication to the destination UE 615 in an SFN manner. This may improve reliability and likelihood of successful reception of the sidelink communication by the destination UE 615. By using the base station 110 to control, coordinate, and/or schedule transmissions of the sidelink communication in an SFN manner, interference may be reduced as compared to a scenario where a large number of UEs act as helper UEs due to lack of control, coordination, and/or scheduling by a base station.

As indicated above, FIG. 6 is provided as an example. Other examples may differ from what is described with respect to FIG. 6.

Figure 7:
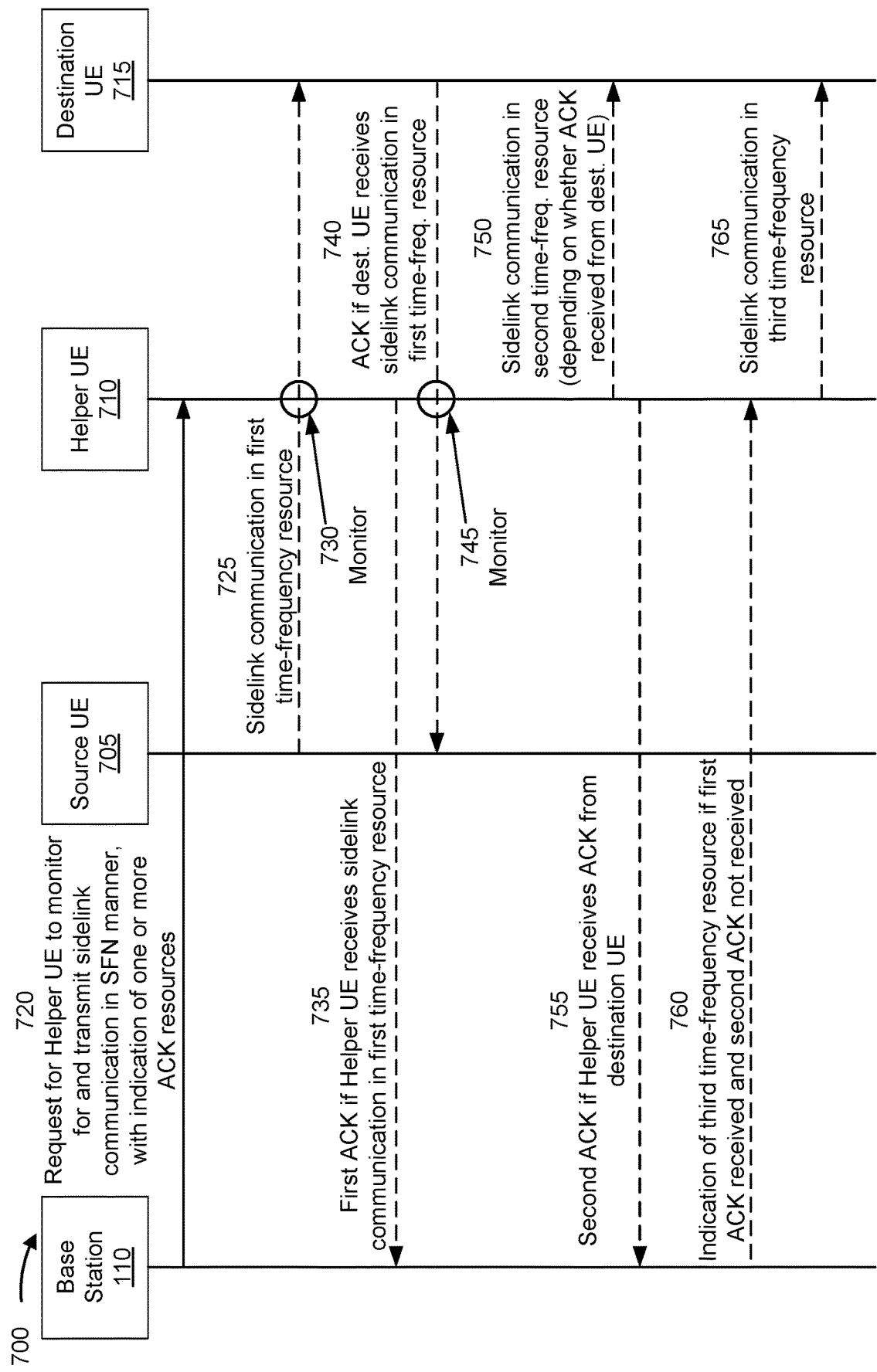

FIG. 7 is a diagram illustrating an example 700 associated with retransmission of sidelink communications in a single-frequency network, in accordance with the present disclosure. As shown in FIG. 7, two or more of a base station 110, a source UE 705, a helper UE 710, and/or a destination UE 715 may communicate with one another. The source UE 705, the helper UE 710, and the destination UE 715 are example of UEs 120 capable of sidelink communication, and may correspond to the source UE 505, the helper UE 510, and the destination UE 515 of FIG. 5, respectively. Additionally, or alternatively, the source UE 705, the helper UE 710, and the destination UE 715 may correspond to the source UE 605, the helper UE 610, and the destination UE 615 of FIG. 6, respectively.

As shown by reference number 720, the base station 110 may transmit (e.g., using transmission component 1704, shown in FIG. 17), and the helper UE 710 may receive (e.g., using reception component 1502, shown in FIG. 15), a request for the helper UE 710 to monitor for and transmit a sidelink communication in a manner that uses a single-frequency network (e.g., in an SFN manner), as described above in connection with reference number 525 of FIG. 5 and/or reference number 630 of FIG. 6. In some aspects, the request may indicate one or more acknowledgement (ACK) resources. An ACK resource may also be called a HARQ-ACK resource or an ACK/NACK resource. An ACK resource may be a resource scheduled for transmission of an ACK or a NACK, HARQ-ACK feedback, or ACK/NACK information.

For example, the request may indicate a resource (e.g., a first resource in the time domain and/or frequency domain, and/or a first access link resource) to be used for transmission of an ACK message (e.g., a first ACK message) from the helper UE 710 to the base station 110 if the helper UE 710 successfully receives the sidelink communication in the first time-frequency resource. Additionally, or alternatively, the request may indicate a sidelink resource (e.g., a PSFCH resource) to be used by the destination UE 715 for transmission of an ACK message that acknowledges reception of the sidelink communication transmitted by the source UE 705 to the destination UE 715. Additionally, or alternatively, the request may indicate a resource (e.g., a second resource in the time domain and/or frequency domain, and/or a second access link resource) to be used for transmission of an ACK message (e.g., a second ACK message) from the helper UE 710 to the base station 110 if the helper UE 710 receives an ACK message, from the destination UE 715 (e.g., in the sidelink resource described above), indicating that the destination UE 715 has successfully received the sidelink communication.

As shown by reference number 725, the source UE 705 may transmit (e.g., using transmission component 1604, shown in FIG. 16) a sidelink communication to the destination UE 715 in a first time-frequency resource of the SFN, as described above in connection with reference number 530 of FIG. 5 and/or reference number 640 of FIG. 6. Reference number 725 is shown in connection with a dashed line because sometimes an attempted transmission of the sidelink communication may fail, such as when a channel access procedure (e.g., a channel sensing procedure and/or a listen-before-talk (LBT) procedure), performed by the source UE 705, fails. As shown by reference number 730, the helper UE 710 may monitor for (e.g., using communication manager 140, monitoring component 1510, and/or reception component 1502, shown in FIG. 15) the sidelink communication in the first time-frequency resource of the SFN, in a similar manner as described above in connection with reference number 535 of FIG. 5 and/or reference number 645 of FIG. 6. This monitoring may result in successful reception of the sidelink communication by the helper UE 710 or unsuccessful reception of the sidelink communication by the helper UE 710.

As shown by reference number 735, the helper UE 710 may transmit (e.g., using transmission component 1504, shown in FIG. 15), and the base station 110 may receive (e.g., using reception component 1702, shown in FIG. 17), an ACK (shown as a "first ACK") if the helper UE 710 successfully receives the sidelink communication in the first time-frequency resource. In some aspects, the first ACK may be transmitted in a first resource, sometimes referred to herein as a "first ACK resource." In some aspects, the first ACK resource is indicated to the helper UE 710 by the base station 110 in the request described elsewhere herein (e.g., in connection with reference number 720). In some aspects, the first ACK resource is an ACK-only PUCCH resource. Additionally, or alternatively, the first ACK resource may be assigned to a GC-PUCCH resource (e.g., which may be indicated in a GC-PDCCH signaling message). In this way, multiple helper UEs may use the same resource to transmit the first ACK, which may indicate to the base station that at least one of the helper UEs received the sidelink communication in the first time-frequency resource (and thus likely retransmitted the sidelink communication in the second time-frequency resource).

In some aspects, if the helper UE 710 does not successfully receive the sidelink communication in the first time-frequency resource, then the helper UE 710 may refrain from transmitting the ACK to the base station 110 in the first resource (as indicated by the dashed line shown in connection with reference number 735). In this example, the base station 110 may determine that the helper UE 710 successfully received the sidelink communication in the first time-frequency resource if the base station 110 receives the ACK in the first resource, and the base station 110 may determine that the helper UE 710 did not successfully receive the sidelink communication in the first time-frequency resource if the base station 110 does not receive the ACK in the first resource.

Alternatively, the helper UE 710 may transmit a NACK in the first resource if the helper UE 710 does not successfully receive the sidelink communication in the first time-frequency resource. In this example, the base station 110 may determine that the helper UE 710 successfully received the sidelink communication in the first time-frequency resource if the base station 110 receives the ACK in the first resource, and the base station 110 may determine that the helper UE 710 did not successfully receive the sidelink communication in the first time-frequency resource if the base station 110 receives the NACK in the first resource. In some aspects, the base station 110 may use this determination to determine whether to coordinate and/or schedule additional transmissions of the sidelink communication.

As shown by reference number 740, the destination UE 715 may transmit, to the source UE 705, an ACK message in a sidelink resource (e.g., a PSFCH resource, such as a resource in the time domain and/or frequency domain for sidelink communications) if the destination UE successfully receives the sidelink communication from the source UE 705 (e.g., in the first time-frequency resource). The sidelink resource may be scheduled by the base station 110, may be scheduled by another UE (e.g., a sidelink control UE that controls and/or coordinates sidelink communications), and/or may be determined by the destination UE 715 based at least in part on the first time-frequency resource, among other examples. As shown by reference number 745, the helper UE 710 may monitor for (e.g., using communication manager 140, monitoring component 1510, and/or reception component 1502, shown in FIG. 15) the ACK message in the sidelink resource. In some aspects, the sidelink resource may be indicated to the helper UE 710 by the base station 110 (e.g., in the request described above in connection with reference number 720). Additionally, or alternatively, the request described above in connection with reference number 720 may indicate a receive beam to be used by the helper UE 710 to monitor for the ACK message from the destination UE 715. Additionally, or alternatively, the helper UE 710 may determine the sidelink resource based at least in part on the first time-frequency resource (e.g., using a time offset and/or a frequency offset, which may be indicated to the helper UE 710 by the base station 110, in some aspects).

In some aspects, if the destination UE 715 does not successfully receive the sidelink communication in the first time-frequency resource, then the destination UE 715 may refrain from transmitting the ACK to the source UE 705 in the sidelink resource (as indicated by the dashed line shown in connection with reference number 740), and the helper UE 710 may not receive an ACK in the sidelink resource. In this example, the helper UE 710 may determine that the destination UE 715 successfully received the sidelink communication in the first time-frequency resource if the helper UE 710 receives the ACK in the sidelink resource, and the helper UE 710 may determine that the destination UE 715 did not successfully receive the sidelink communication in the first time-frequency resource if the helper UE 710 does not receive the ACK in the sidelink resource.

Alternatively, the destination UE 715 may transmit a NACK to the source UE 705 in the sidelink resource if the destination UE 715 does not successfully receive the sidelink communication in the first time-frequency resource, and the helper UE 710 may receive the NACK in the sidelink resource. In this example, the helper UE 710 may determine that the destination UE 715 successfully received the sidelink communication in the first time-frequency resource if the helper UE 710 receives the ACK in the sidelink resource, and the helper UE 710 may determine that the destination UE 715 did not successfully receive the sidelink communication in the first time-frequency resource if the helper UE 710 receives the NACK in the sidelink resource.

In some aspects, the helper UE 710 may use this determination to determine whether to transmit the sidelink communication (e.g., in the second time-frequency resource). For example, as shown by reference number 750, if the destination UE 715 did not successfully receive the sidelink communication in the first time-frequency resource (e.g., as indicated by a NACK or absence of an ACK in the sidelink resource), then the helper UE 710 may transmit (e.g., using transmission component 1504, shown in FIG. 15) the sidelink communication in the second time-frequency resource, as described above in connection with reference number 540 of FIG. 5 and/or reference number 650 of FIG. 6. This improves the likelihood of successful reception of the sidelink communication by the destination UE 715. As another example (and as indicated by the dashed line shown in connection with reference number 750), if the destination UE 715 successfully received the sidelink communication in the first time-frequency resource (e.g., as indicated by an ACK in a PSFCH resource), then the helper UE 710 may refrain from transmitting the sidelink communication in the second time-frequency resource. This conserves network resources. In some aspects, the request transmitted to the helper UE 710 (e.g., in connection with reference number 720) may indicate whether the helper UE 710 is to skip retransmission of the sidelink communication in the second time-frequency resource if the helper UE 710 receives the ACK from the destination UE 715, and the helper UE 710 may operate according to this indication.

As shown by reference number 755, the helper UE 710 may transmit (e.g., using transmission component 1504, shown in FIG. 15), and the base station 110 may receive (e.g., using reception component 1702, shown in FIG. 17), an ACK (shown as a "second ACK") if the helper UE 710 receives an ACK (e.g., in the sidelink resource) indicating that the destination UE 715 successfully received the sidelink communication in the first time-frequency resource. In some aspects, the second ACK may be transmitted in a second resource, sometimes referred to herein as a "second ACK resource." In some aspects, the second ACK resource is indicated to the helper UE 710 by the base station 110 in the request described elsewhere herein (e.g., in connection with reference number 720). In some aspects, the second ACK resource is an ACK-only PUCCH resource. Additionally, or alternatively, the second ACK resource may be assigned to a GC-PUCCH resource (e.g., which may be indicated in a GC-PDCCH signaling message). In this way, multiple helper UEs may use the same resource to transmit the second ACK, which may indicate to the base station that the destination UE successfully received the sidelink communication if at least one helper UE indicates an ACK in the second ACK resource.

In some aspects, if the helper UE 710 does not receive the ACK from the destination UE 715, then the helper UE 710 may refrain from transmitting an ACK to the base station 110 in the second resource (as indicated by the dashed line shown in connection with reference number 755). In this example, the base station 110 may determine that the helper UE 710 received the ACK from the destination UE 715 (and that the destination UE 715 successfully received the sidelink communication in the first time-frequency resource) if the base station 110 receives the ACK in the second resource, and the base station 110 may determine that the helper UE 710 did not receive the ACK from the destination UE 715 (and that the destination UE 715 did not successfully receive the sidelink communication in the first time-frequency resource) if the base station 110 does not receive the ACK in the second resource.

Alternatively, the helper UE 710 may transmit a NACK in the second resource if the helper UE 710 does not receive an ACK (e.g., in the sidelink resource) indicating that the destination UE 715 successfully received the sidelink communication in the first time-frequency resource. In this example, the base station 110 may determine that the helper UE 710 received the ACK from the destination UE 715 (and that the destination UE 715 successfully received the sidelink communication in the first time-frequency resource) if the base station 110 receives the ACK in the second resource, and the base station 110 may determine that the helper UE 710 did not receive the ACK from the destination UE 715 (and that the destination UE 715 did not successfully receive the sidelink communication in the first time-frequency resource) if the base station 110 receives the NACK in the second resource. In some aspects, the base station 110 may use this determination to determine whether to coordinate and/or schedule additional transmissions of the sidelink communication.

For example, as shown by reference number 760, if the base station 110 determines that the helper UE 710 did not receive the ACK from the destination UE 715 in the sidelink resource and/or that the destination UE 715 did not successfully receive the sidelink communication in the first time-frequency resource, then the base station 110 may transmit (e.g., using transmission component 1704, shown in FIG. 17), to the helper UE 710, an indication (e.g., in a signaling message, such as DCI) of a third time-frequency resource of the SFN to be used by the helper UE 710 to transmit the sidelink communication in an SFN manner. This increases the likelihood of successful reception of the sidelink communication by the destination UE 715. In this example, if the base station 110 determines that the helper UE 710 received the ACK from the destination UE 715 in the sidelink resource and/or that the destination UE 715 successfully receive the sidelink communication in the first time-frequency resource, then the base station 110 may refrain from transmitting the indication of the third time-frequency resource (as indicated by the dashed line shown in connection with reference number 760). This conserves network resources and processing resources of the helper UE 710.

As another example, if the base station 110 determines that the helper UE 710 received the sidelink communication in the first time-frequency resource (e.g., as indicated by reception of the first ACK, as described above in connection with reference number 735), and the base station 110 determines that the helper UE 710 did not receive the ACK from the destination UE 715 in the sidelink resource and/or that the destination UE 715 did not successfully receive the sidelink communication in the first time-frequency resource (e.g., as indicated by failure to receive the second ACK, as described above in connection with reference number 755), then the base station 110 may transmit, to the helper UE 710, an indication of a third time-frequency resource of the SFN to be used by the helper UE 710 to transmit the sidelink communication in an SFN manner. This increases the likelihood of successful reception of the sidelink communication by the destination UE 715. In this example, if the base station 110 determines that the helper UE 710 did not receive the ACK from the destination UE 715 in the sidelink resource and/or that the destination UE 715 did not successfully receive the sidelink communication in the first time-frequency resource (e.g., as indicated by failure to receive the second ACK, as described above in connection with reference number 755), but the base station 110 also determines that the helper UE 710 did not receive the sidelink communication in the first time-frequency resource (e.g., as indicated by failure to receive the first ACK, as described above in connection with reference number 735), then the base station 110 may refrain from transmitting the indication of the third time-frequency resource. This conserves network resources and processing resources of the helper UE 710.

As shown by reference number 765, the helper UE 710 may transmit (e.g., using transmission component 1504, shown in FIG. 15) the sidelink communication in the third time-frequency resource of the SFN if the helper UE 710 receives the indication of the third time-frequency resource from the base station 110 (e.g., in a signaling message, such as DCI granting and/or scheduling transmission of the sidelink communication). In this way, the helper UE 710 can retransmit the sidelink communication without first needing to perform additional monitoring for the sidelink communication, thereby conserving processing resources of the helper UE 710 and reducing delay in retransmission of the sidelink communication. The sidelink communication may be processed, coordinated, and/or transmitted in the third time-frequency resource in a similar manner as described elsewhere herein in connection with the second time-frequency resource (e.g., in connection with reference number 540 of FIG. 5 and/or reference number 650 of FIG. 6). If the helper UE 710 does not receive an indication of the third time-frequency resource, then the helper UE 710 may refrain from transmitting the sidelink communication in the third time-frequency resource (e.g., as indicated by the dashed line shown in connection with reference number 765).

In this way, techniques and apparatuses described herein enable the helper UE 710 to receive a sidelink communication, transmitted by the source UE 705 to the destination UE 715, and transmit (or retransmit) that sidelink communication to the destination UE 715 in an SFN manner if appropriate (e.g., conserving network resources and/or processing resources by utilizing ACK/NACK information). This may improve reliability and likelihood of successful reception of the sidelink communication by the destination UE 715. By using the base station 110 to control, coordinate, and/or schedule transmissions of the sidelink communication in an SFN manner, interference may be reduced as compared to a scenario where a large number of UEs act as helper UEs due to lack of control, coordination, and/or scheduling by a base station.

As indicated above, FIG. 7 is provided as an example. Other examples may differ from what is described with respect to FIG. 7.

Figure 8:
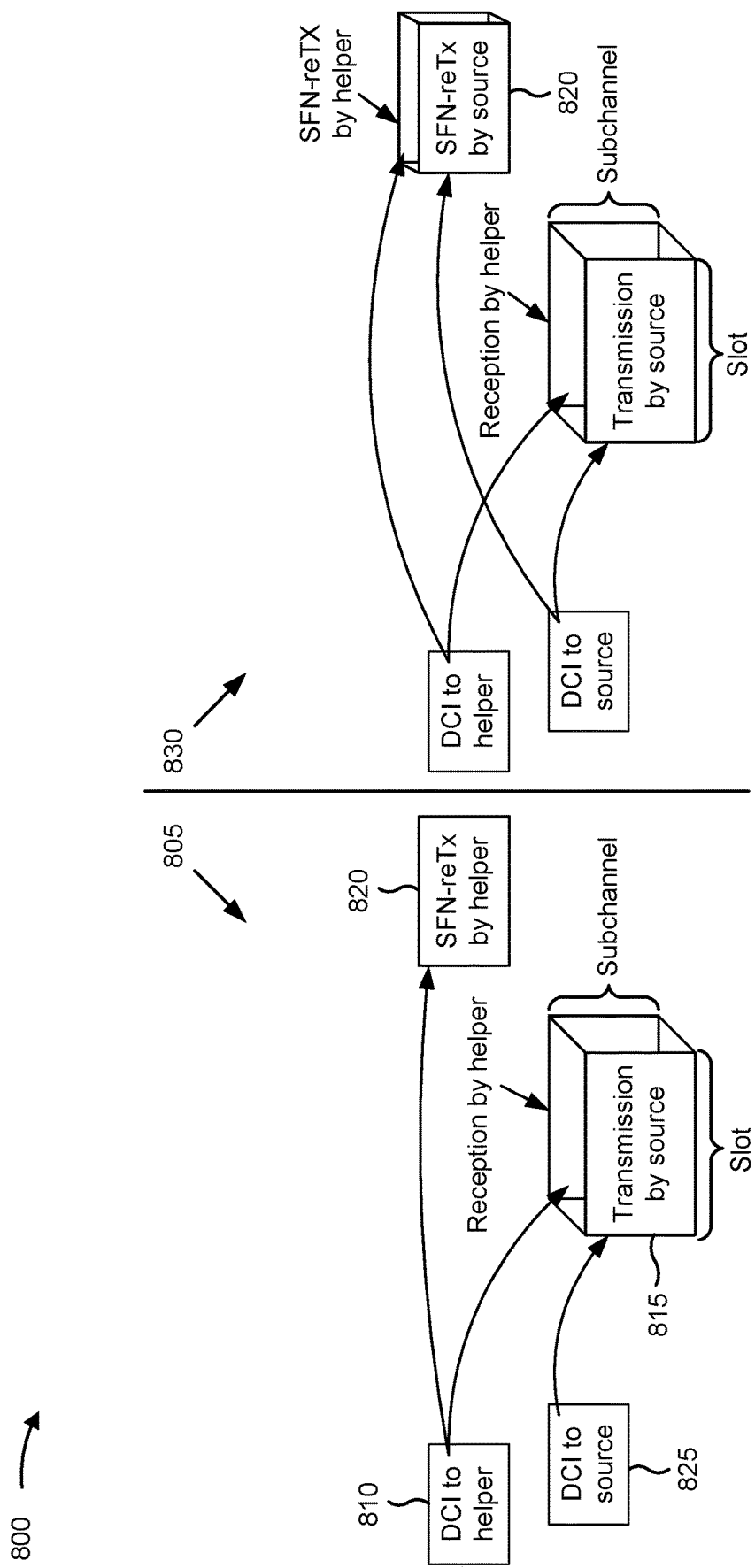

FIG. 8 is a diagram illustrating an example 800 associated with retransmission of sidelink communications in a single-frequency network, in accordance with the present disclosure.

As shown in FIG. 8, in a first example 805, DCI 810 transmitted to a helper UE indicates a first time-frequency resource 815 (e.g., a slot and a subchannel) to be used by the helper UE for reception of a sidelink communication. The DCI 810 transmitted to the helper UE also indicates a second time-frequency resource 820 (e.g., a slot and a subchannel) to be used by the helper UE for transmission of the sidelink communication. As further shown, another DCI 825 transmitted to a source UE indicates the first time-frequency resource 815 to be used by the source UE for transmission of the sidelink communication. As shown, the same time-frequency resource (e.g., the first time-frequency resource 815) is indicated to the source UE for transmission of the sidelink communication and to the helper UE for reception of the sidelink communication to enable coordination between the source UE and the helper UE. In the first example 805, the DCI 825 transmitted to the source UE does not indicate the second time-frequency resource 820 because, for example, the source UE may not participate in SFN retransmission (e.g., retransmission in an SFN manner) of the sidelink communication.

A second example 830 shown in FIG. 8 is the same as the first example 805, except that in the second example 830, the DCI 825 transmitted to the source UE indicates the second time-frequency resource 820. In the second example 830, the source UE retransmits the sidelink communication in an SFN manner in the second time-frequency resource 820.

As indicated above, FIG. 8 is provided as an example. Other examples may differ from what is described with respect to FIG. 8.

Figure 9:
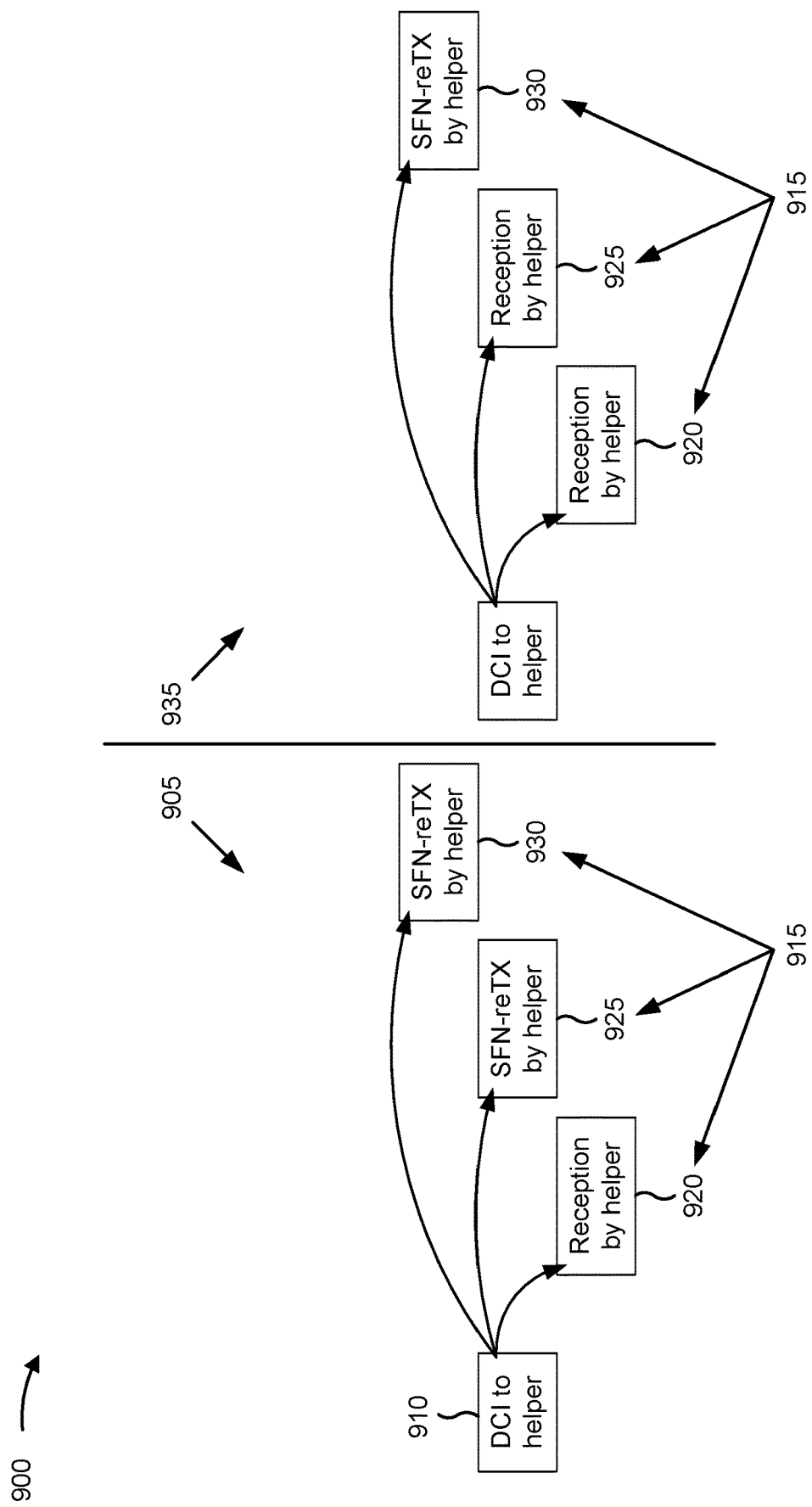

FIG. 9 is a diagram illustrating an example 900 associated with retransmission of sidelink communications in a single-frequency network, in accordance with the present disclosure. FIG. 9 shows examples where a signaling message transmitted to the helper UE (e.g., the request described in connection with reference number 525 of FIG. 5, reference number 630 of FIG. 6, and/or reference number 720 of FIG. 7) and/or to the source UE (e.g., the indication described in connection with reference number 635 of FIG. 6) indicates more than two time-frequency resources. The more than two time-frequency resources may include the first time-frequency resource described elsewhere herein (e.g., in connection with FIGS. 5-8), the second time-frequency resource described elsewhere herein (e.g., in connection with FIGS. 5-8), and one or more additional time-frequency resources (e.g., a third time-frequency resources, a fourth-time frequency resource, and so on).

As shown in FIG. 9, in a first example 905, DCI 910 transmitted to a helper UE indicates three time-frequency resources 915, shown as a first time-frequency resource 920, a second time-frequency resource 925, and a third time-frequency resource 930, which occur in sequence. For example, the first time-frequency resource 920 occurs before the second time-frequency resource 925, and the second time-frequency resource 925 occurs before the third time-frequency resource 930. In some aspects, the helper UE may monitor an earliest-occurring time-frequency resource, indicated to the helper UE, for the sidelink communication. In the first example 905, the earliest-occurring time-frequency resource indicated to the helper UE is the first time-frequency resource 920. If the helper UE successfully receives the sidelink communication in the earliest-occurring time-frequency resource, then the helper UE transmits the sidelink communication in the second-earliest-occurring time-frequency resource indicated to the helper UE, which is the second time-frequency resource 925 in the first example 905 (e.g., a next-occurring time-frequency resource after the earliest-occurring time-frequency resource). In some aspects, if the helper UE successfully receives the sidelink communication in the earliest-occurring time-frequency resource, then the helper UE also transmits the sidelink communication in the third-earliest-occurring time-frequency resource indicated to the helper UE, which is the third time-frequency resource 930 in the first example 905. Alternatively, if the helper UE receives an ACK from the destination UE (e.g., as described above in connection with reference numbers 740 and 745 of FIG. 7), then the helper UE may skip retransmission in any time-frequency resources that occur after reception and/or processing of the ACK.

In the second example 935, the helper UE does not successfully receive the sidelink communication in the earliest-occurring time-frequency resource (e.g., the first time-frequency resource 920). For example, the source UE may fail to gain access to a channel (e.g., due to a failed channel sensing procedure) for transmission of the sidelink communication in the first time-frequency resource 920 and/or the helper UE may fail to receive the sidelink communication due to poor channel quality. As another example, the helper UE may need to combine sidelink communications received in the first time-frequency resource 920 and the second time-frequency resource 925 to successfully receive the sidelink communication. As shown by the second example 935, if the helper UE does not successfully receive the sidelink communication in the earliest-occurring time-frequency resource, then the helper UE monitors for the sidelink communication in the second-earliest-occurring time-frequency resource indicated to the helper UE, which is the second time-frequency resource 925 (e.g., a next-occurring time-frequency resource after the earliest-occurring time-frequency resource). As further shown by the second example 935, if the helper UE successfully receives the sidelink communication in the second-earliest-occurring time-frequency resource (e.g., the second time-frequency resource 925), either independently or due to combining with the sidelink communication received in the earliest-occurring time-frequency resource, then the helper UE transmits the sidelink communication in the third-earliest-occurring time-frequency resource indicated to the helper UE, which is the third time-frequency resource 930 (e.g., a next-occurring time-frequency resource after the second-earliest-occurring time-frequency resource). If the helper UE does not successfully receive the sidelink communication in the second-earliest-occurring time-frequency resource (e.g., the second time-frequency resource 925), then the helper UE may skip or drop transmission in the third-earliest-occurring time-frequency resource (e.g., the third time-frequency resource 930).

Although FIG. 9 shows three time-frequency resources indicated to the helper UE, similar examples as described above apply to aspects where the signaling message to the helper UE indicates more than three time-frequency resources. Furthermore, although FIG. 9 shows DCI 910 transmitted to the helper UE, similar examples as described above apply to aspects where more than two time-frequency resources are indicated to the source UE (e.g., where "reception by helper" in FIG. 9 becomes "transmission by source" and "SFN-reTX by helper" in FIG. 9 becomes "SFN-reTX by source" in a scenario where the source UE participates in SFN-retransmission).

As indicated above, FIG. 9 is provided as an example. Other examples may differ from what is described with respect to FIG. 9.

Figure 10:
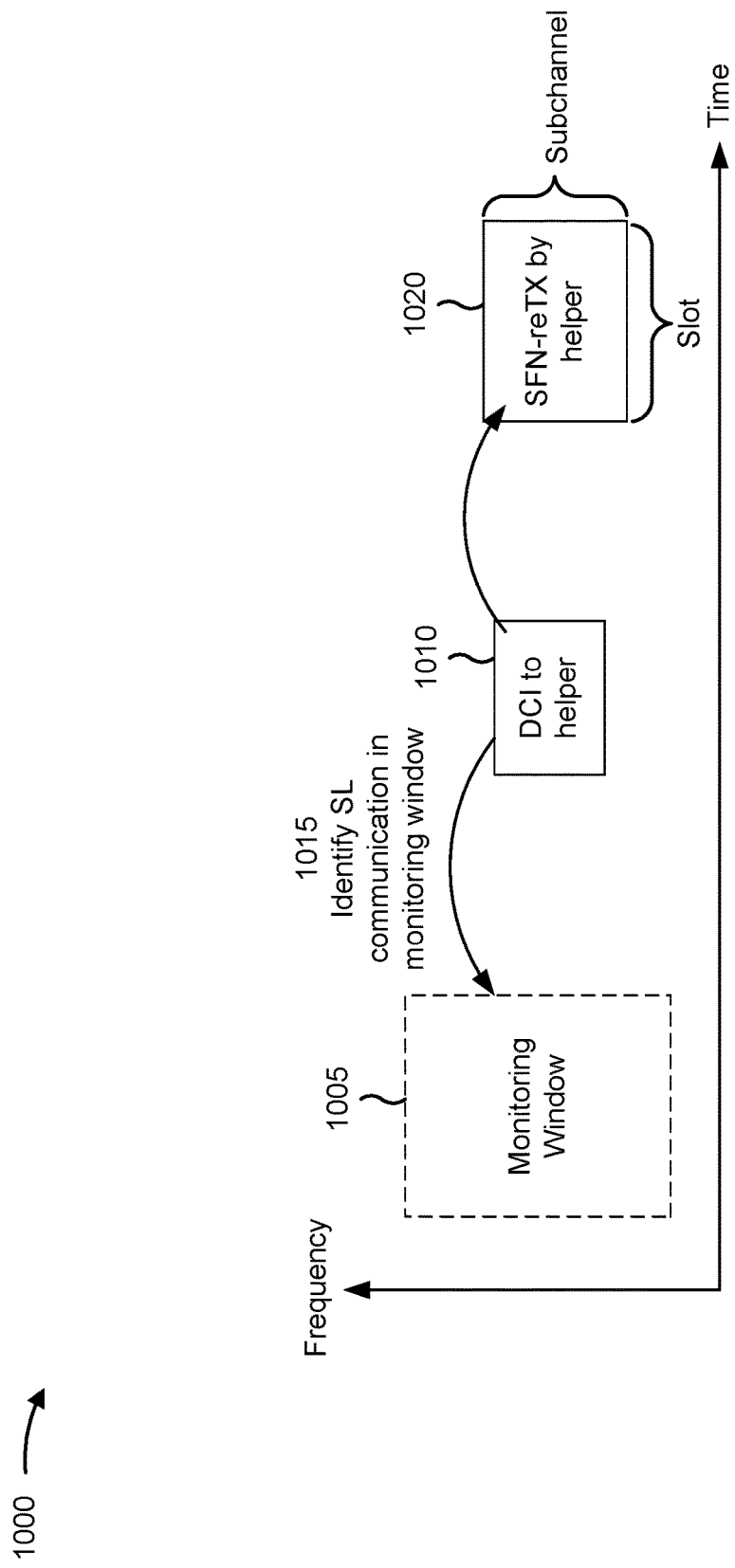

FIG. 10 is a diagram illustrating an example 1000 associated with retransmission of sidelink communications in a single-frequency network, in accordance with the present disclosure. FIG. 10 shows an example where a signaling message transmitted to the helper UE (e.g., the request described in connection with reference number 525 of FIG. 5, reference number 630 of FIG. 6, and/or reference number 720 of FIG. 7) indicates a monitoring window 1005. The monitoring window 1005 may include a set of time-frequency resources (e.g., in the time domain and frequency domain) that includes the first time-frequency resource described elsewhere herein (e.g., in connection with FIGS. 5-8).

As shown in FIG. 10, a base station may indicate, to a helper UE, a monitoring window 1005 to be monitored by the helper UE for one or more sidelink communications. The monitoring window 1005 may include a set of time-frequency resources. The base station may indicate the monitoring window 1005 to the helper UE in, for example, an RRC message, a SIB, and/or a DCI message. The helper UE may monitor sidelink communications in the monitoring window 1005 based at least in part on the indication from the base station. For example, the helper UE may buffer signals received in the monitoring window 1005 for which an energy level satisfies a threshold. Additionally, or alternatively, the helper UE may discard signals received in the monitoring window 1005 for which an energy level does not satisfy a threshold. The helper UE may monitor all frequency resources (e.g., subchannels) included in a frequency domain resource allocation (FDRA) indicated for the monitoring window 1005 within a time domain resource allocation (TDRA) indicated for the monitoring window 1005. Additionally, or alternatively, the helper UE may be configured with spatial domain resources (e.g., receive beams) to be used to monitor for sidelink communications within the monitoring window 1005.

In some aspects, the helper UE may continuously monitor all frequency domain resources within the FDRA (e.g., using one or more indicated receive beams), and may discard sidelink communications that are older than a threshold amount of time (e.g., equal to the duration of the monitoring window 1005). Thus, the monitoring window 1005 may be a sliding window in the time domain. Additionally, or alternatively, the helper UE may discard sidelink communications for which the helper UE has received an ACK.

As further shown in FIG. 10, the base station may transmit a signaling message 1010 (shown as DCI in FIG. 10) to the helper UE. In some aspects, this signaling message may correspond to the request described in connection with reference number 525 of FIG. 5, reference number 630 of FIG. 6, and/or reference number 720 of FIG. 7. In some aspects, the signaling message 1010 may indicate a particular time-frequency resource (e.g., corresponding to the first time-frequency resource described elsewhere herein) within the monitoring window 1005. The helper UE may buffer (e.g., store in memory) sidelink communications received in the monitoring window 1005 and may identify one of those sidelink communications that was received in the particular time-frequency resource, as shown by reference number 1015. As shown by reference number 1020, the helper UE may transmit the identified sidelink communication in a second time-frequency resource (e.g., in an SFN manner), which may be indicated to the helper UE in the signaling message 1010. This enables the helper UE to perform SFN retransmissions for sidelink communications received prior to reception of the signaling message 1010. In some aspects, the FDRA of the monitoring window 1005 may be defined with respect to a frequency domain resource in which the signaling message 1010 is received, and the helper UE may discard sidelink communications outside of the monitoring window 1005 prior to attempting to identify sidelink communications to be retransmitted in an SFN manner (e.g., using a source UE identifier and/or a destination UE identifier, as described below).

In some aspects, the signaling message 1010 may indicate a source UE identifier that identifies a source UE that transmitted a sidelink communication that is to be retransmitted by the helper UE in an SFN manner. Additionally, or alternatively, the signaling message 1010 may indicate a destination UE identifier that identifies a destination UE that is an intended recipient of a sidelink communication that is to be retransmitted by the helper UE in an SFN manner. In some aspects, the signaling message 1010 may indicate the source UE identifier and/or the destination UE identifier rather than explicitly indicating the first time-frequency resource that is within the monitoring window 1005. The helper UE may use the source UE identifier and/or the destination UE identifier to identify a sidelink communication, received by the helper UE within the monitoring window 1005, to be retransmitted by the helper UE in an SFN manner. For example, the helper UE may read and/or decode sidelink communications received within the monitoring window 1005 to identify one or more sidelink communications containing a source UE identifier that matches the source UE identifier indicated in the signaling message 1010, containing a destination UE identifier that matches the destination UE identifier indicated in the signaling message 1010, or containing both the matching source UE identifier and the matching destination UE identifier. For example, an identified sidelink communication may occur in a first time-frequency resource within the monitoring window 1005. The helper UE may transmit the identified sidelink communication in the second time-frequency resource (e.g., in an SFN manner), which may be indicated to the helper UE in the signaling message 1010.

Although FIG. 10 shows the monitoring window 1005 occurring before the signaling message 1010, in some aspects, the monitoring window 1005 may occur after the signaling message 1010. In this case, the helper UE may identify one or more sidelink communications that occur in a monitoring window 1005 that occurs after the signaling message 1010. In some aspects, the monitoring window 1005 may be periodic. In this case, the helper UE may identify one or mor sidelink communications that occur in a monitoring window that occurs before the signaling message 1010 and/or that occurs after the signaling message 1010. For example, the helper UE may identify one or more sidelink communications in only a monitoring window that occurs before the signaling message 1010, may identify one or more sidelink communications in only a monitoring window that occurs after the signaling message 1010, or may identify one or more sidelink communications in monitoring windows that occur both before and after the signaling message 1010.

As indicated above, FIG. 10 is provided as an example. Other examples may differ from what is described with respect to FIG. 10.

Figure 11:
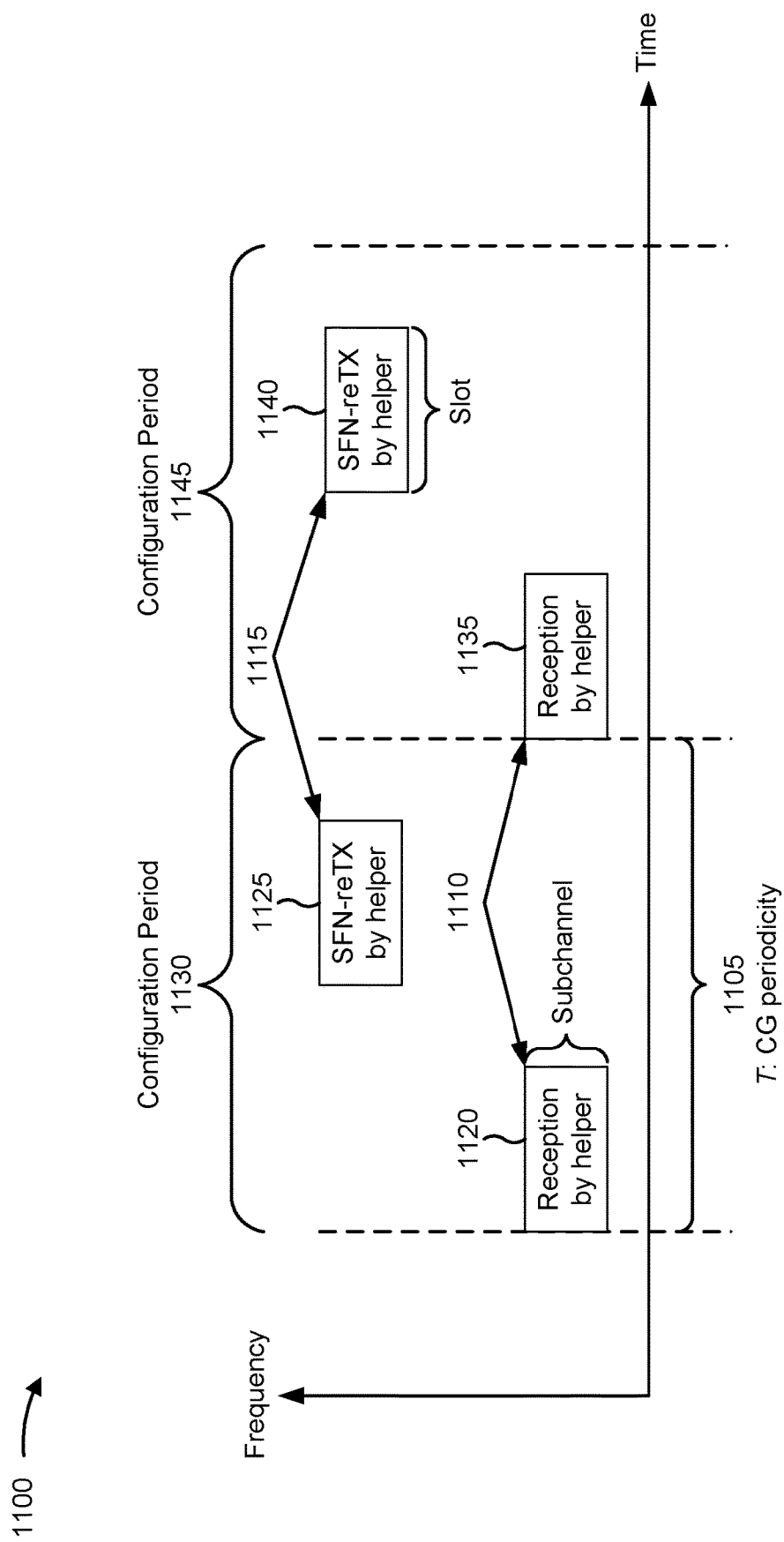

FIG. 11 is a diagram illustrating an example 1100 associated with retransmission of sidelink communications in a single-frequency network, in accordance with the present disclosure. FIG. 11 shows an example where the helper UE is configured with periodic reception of sidelink communications and/or periodic SFN-retransmission of sidelink communications. In this example, a signaling message transmitted to the helper UE (e.g., the request described in connection with reference number 525 of FIG. 5, reference number 630 of FIG. 6, and/or reference number 720 of FIG. 7) may be an RRC message (e.g., an RRC configuration message or an RRC reconfiguration message) or another type of configuration message that configures periodic sidelink communications for the helper UE.

In some aspects, a base station may transmit, to the helper UE, a configuration message (e.g., an RRC message) that indicates a configured grant (CG) configuration for periodic sidelink communications. For example, the CG configuration may indicate a periodicity 1105 (e.g., having a duration of T) with which the helper UE is to monitor for sidelink communications and/or retransmit those sidelink communications in an SFN manner. As shown by reference number 1110, the helper UE may monitor for sidelink communications, to be retransmitted by the helper UE in an SFN manner, according to the periodicity. The helper UE may monitor for each sidelink communication as described elsewhere herein (e.g., in connection with FIGS. 5-8). In this example, a resource in which the helper UE monitors for a sidelink communication may correspond to the first time-frequency resource described elsewhere herein. The base station may also configure the source UE with a CG configuration that aligns source UE transmissions with helper UE receptions (e.g., in the same periodic time-frequency resources), and/or that aligns source UE retransmissions with helper UE retransmissions (e.g., in an example where the source UE participates in SFN retransmission). Additionally, or alternatively, the base station may configure one or more other helper UEs with the CG configuration shown in FIG. 11 to enable SFN retransmissions.

As shown by reference number 1115, may retransmit a sidelink communication, in an SFN manner, according to the periodicity. The helper UE may retransmit each sidelink communication as described elsewhere herein (e.g., in connection with FIGS. 5-8). In this example, a resource in which the helper UE retransmits a sidelink communication may correspond to the second time-frequency resource described elsewhere herein. In some aspects, the UE may retransmit, in a second time-frequency resource, only a sidelink communication received in a first time-frequency resource that is within the same CG configuration period.

For example, the helper UE may receive a sidelink communication in a first time-frequency resource 1120 and may retransmit that sidelink communication in a second time-frequency resource 1125 because the first time-frequency resource 1120 and the second time-frequency resource 1125 are within the same configuration period 1130. In this example, the helper UE may refrain from retransmitting the sidelink communication, received in the first time-frequency resource 1120, using the second time-frequency resource 1140 because the first time-frequency resource 1120 and the second time-frequency resource 1140 are in different configuration periods. However, the helper UE may receive a sidelink communication in a first time-frequency resource 1135 and may retransmit that sidelink communication in the second time-frequency resource 1140 because the first time-frequency resource 1135 and the second time-frequency resource 1140 are within the same configuration period 1145.

Alternatively, the helper UE may retransmit a sidelink communication in multiple configuration periods. For example, the helper UE may receive a sidelink communication in the first time-frequency resource 1120 and may retransmit that sidelink communication in both the time-frequency resource 1125 and the time-frequency resource 1140. In some aspects, the CG configuration may indicate whether to retransmit a sidelink communication in a single configuration period (e.g., a configuration period in which the sidelink communication is received) or in multiple configuration periods, and the helper UE may operate according to this indication.

As indicated above, FIG. 11 is provided as an example. Other examples may differ from what is described with respect to FIG. 11.

Figure 12:
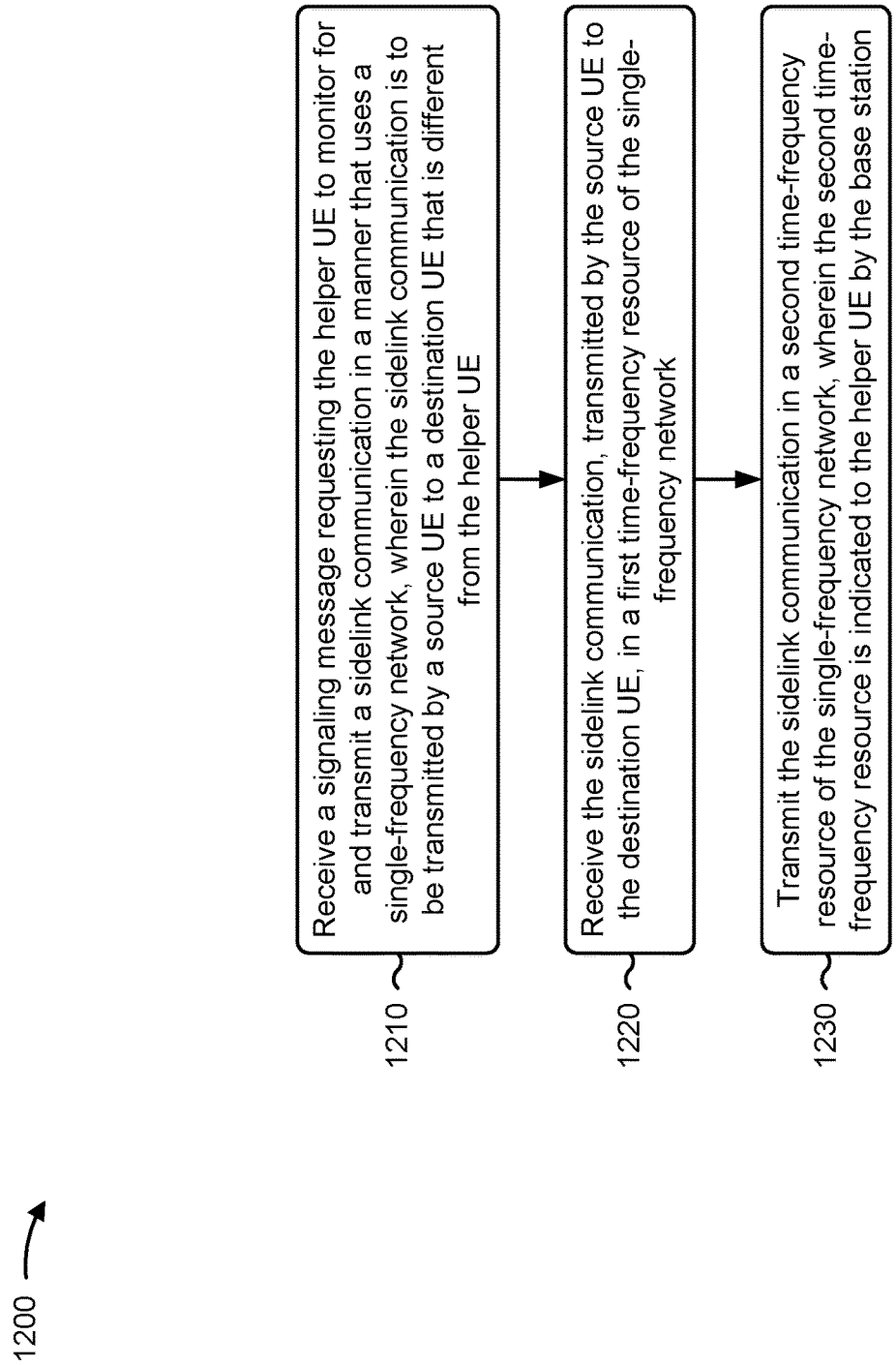
FIGS. 12-14 are diagrams illustrating example processes associated with retransmission of sidelink communications in a single-frequency network, in accordance with the present disclosure.

FIG. 12 is a diagram illustrating an example process 1200 performed, for example, by a helper UE, in accordance with the present disclosure. Example process 1200 is an example where the helper UE (e.g., UE 120, helper UE 415, helper UE 510, helper UE 610, and/or helper UE 710) performs operations associated with retransmission of sidelink communications in an SFN.

As shown in FIG. 12, in some aspects, process 1200 may include receiving, from a base station, a signaling message requesting the helper UE to monitor for and transmit a sidelink communication in a manner that uses a single-frequency network, wherein the sidelink communication is to be transmitted by a source UE to a destination UE that is different from the helper UE (block 1210). For example, the helper UE (e.g., using communication manager 140 and/or reception component 1502, depicted in FIG. 15) may receive, from a base station, a signaling message requesting the helper UE to monitor for and transmit a sidelink communication in a manner that uses a single-frequency network, wherein the sidelink communication is to be transmitted by a source UE to a destination UE that is different from the helper UE, as described above in connection with, for example, reference number 525 of FIG. 5, reference number 630 of FIG. 6, and/or reference number 720 of FIG. 7.

As further shown in FIG. 12, in some aspects, process 1200 may include receiving the sidelink communication, transmitted by the source UE to the destination UE, in a first time-frequency resource of the single-frequency network (block 1220). For example, the helper UE (e.g., using communication manager 140 and/or reception component 1502, depicted in FIG. 15) may receive the sidelink communication, transmitted by the source UE to the destination UE, in a first time-frequency resource of the single-frequency network, as described above in connection with, for example, reference number 535 of FIG. 5, reference number 645 of FIG. 6, and/or reference number 730 of FIG. 7.

As further shown in FIG. 12, in some aspects, process 1200 may include transmitting the sidelink communication in a second time-frequency resource of the single-frequency network, wherein the second time-frequency resource is indicated to the helper UE by the base station (block 1230). For example, the helper UE (e.g., using communication manager 140 and/or transmission component 1504, depicted in FIG. 15) may transmit the sidelink communication in a second time-frequency resource of the single-frequency network, wherein the second time-frequency resource is indicated to the helper UE by the base station, as described above in connection with, for example, reference number 540 of FIG. 5, reference number 650 of FIG. 6, and/or reference number 750 of FIG. 7.

Process 1200 may include additional aspects, such as any single aspect or any combination of aspects described below and/or in connection with one or more other processes described elsewhere herein.

In a first aspect, the second time-frequency resource is a same time-frequency resource as is indicated by the base station to the source UE or another helper UE for transmission of the sidelink communication. In a second aspect, alone or in combination with the first aspect, the sidelink communication is transmitted by the helper UE in the second time-frequency resource using a same waveform as is used for reception of the sidelink communication by the helper UE in the first time-frequency resource. In a third aspect, alone or in combination with one or more of the first and second aspects, the signaling message indicates the first time-frequency resource to be used by the helper UE for reception of the sidelink communication and the second time-frequency resource to be used by the helper UE for transmission of the sidelink communication.

In a fourth aspect, alone or in combination with one or more of the first through third aspects, the sidelink communication transmitted by the helper UE in the second time-frequency resource is constructed by the helper UE based at least in part on a first transmission parameter indicated in the signaling message and a second transmission parameter determined from the sidelink communication received in the first time-frequency resource. In a fifth aspect, alone or in combination with one or more of the first through fourth aspects, the signaling message indicates at least one of a source UE identifier associated with the source UE or a destination UE identifier associated with the destination UE. In a sixth aspect, alone or in combination with one or more of the first through fifth aspects, process 1200 includes validating the sidelink communication received in the first time-frequency resource, using at least one of the source UE identifier or the destination UE identifier, prior to transmitting the sidelink communication in the second time-frequency resource.

In a seventh aspect, alone or in combination with one or more of the first through sixth aspects, the signaling message indicates a sidelink resource to be used by the destination UE for transmission of an acknowledgement message that acknowledges reception of the sidelink communication transmitted by the source UE to the destination UE. In an eighth aspect, alone or in combination with one or more of the first through seventh aspects, process 1200 includes monitoring the resource for the acknowledgement message, wherein the sidelink communication is transmitted in the second time-frequency resource based at least in part on a determination that the acknowledgment message is not received by the helper UE in the resource. In a ninth aspect, alone or in combination with one or more of the first through eighth aspects, the signaling message indicates more than two time-frequency resources of the single-frequency network, including the first time-frequency resource and the second time-frequency resource. In a tenth aspect, alone or in combination with one or more of the first through ninth aspects, the signaling message indicates at least one of a first resource to be used for transmission of a first acknowledgement message from the helper UE to the base station if the helper UE receives the sidelink communication in the first time-frequency resource, or a second resource to be used for transmission of a second acknowledgement message from the helper UE to the base station if the helper UE receives an acknowledgement message from the destination UE indicating that the destination UE has received the sidelink communication.

In an eleventh aspect, alone or in combination with one or more of the first through tenth aspects, process 1200 includes receiving an indication of a monitoring window to be monitored by the helper UE for the sidelink communication, identifying the sidelink communication in the monitoring window using at least one of a source UE identifier associated with the source UE or a destination UE identifier associated with the destination UE, wherein at least one of the source UE identifier or the destination UE identifier is indicated in the signaling message, and wherein the sidelink communication is received in the first time-frequency resource based at least in part on monitoring for and identifying the sidelink communication in the monitoring window.

In a twelfth aspect, alone or in combination with one or more of the first through eleventh aspects, the signaling message includes a GC PDCCH message that indicates whether one or more UEs, in a group of UEs that includes the helper UE, are to monitor for and transmit one or more sidelink communications using the single-frequency network. In a thirteenth aspect, alone or in combination with one or more of the first through twelfth aspects, the signaling message includes at least one of downlink control information or a configuration message that configures periodic sidelink communications for the helper UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
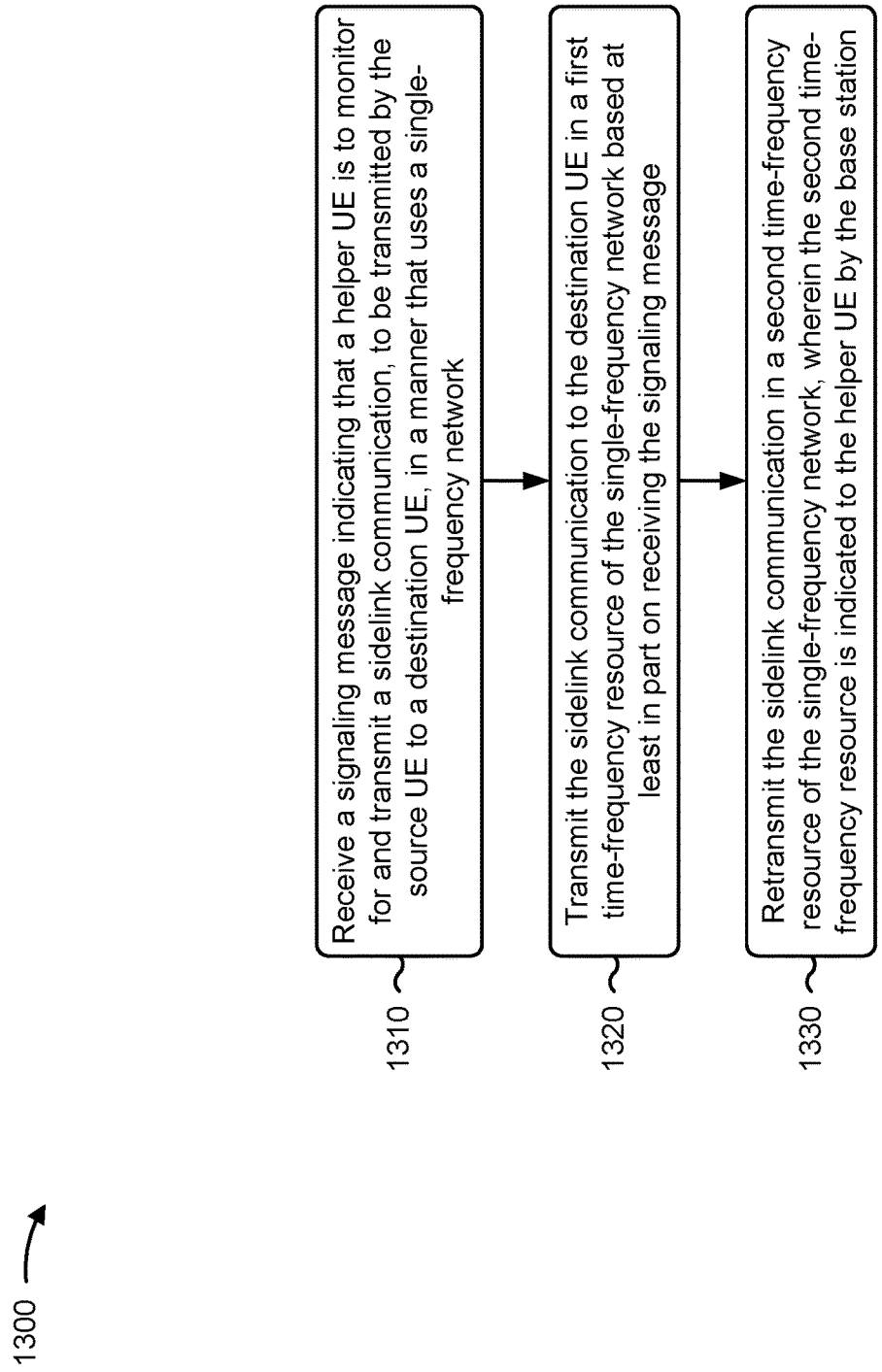

FIG. 13 is a diagram illustrating an example process 1300 performed, for example, by a source UE, in accordance with the present disclosure. Example process 1300 is an example where the source UE (e.g., UE 120, Tx/Rx UE 405, source UE 505, source UE 605, and/or source UE 705) performs operations associated with retransmission of sidelink communications in an SFN.

As shown in FIG. 13, in some aspects, process 1300 may include receiving, from a base station, a signaling message indicating that a helper UE is to monitor for and transmit a sidelink communication, to be transmitted by the source UE to a destination UE, in a manner that uses a single-frequency network (block 1310). For example, the source UE (e.g., using communication manager 140 and/or reception component 1602, depicted in FIG. 16) may receive, from a base station, a signaling message indicating that a helper UE is to monitor for and transmit a sidelink communication, to be transmitted by the source UE to a destination UE, in a manner that uses a single-frequency network, as described above in connection with, for example, reference number 635 of FIG. 6.

As further shown in FIG. 13, in some aspects, process 1300 may include transmitting the sidelink communication to the destination UE in a first time-frequency resource of the single-frequency network based at least in part on receiving the signaling message (block 1320). For example, the source UE (e.g., using communication manager 140 and/or transmission component 1604, depicted in FIG. 16) may transmit the sidelink communication to the destination UE in a first time-frequency resource of the single-frequency network based at least in part on receiving the signaling message, as described above in connection with, for example, reference number 530 of FIG. 5, reference number 640 of FIG. 6, and/or reference number 725 of FIG. 7.

As further shown in FIG. 13, in some aspects, process 1300 may include retransmitting the sidelink communication in a second time-frequency resource of the single-frequency network, wherein the second time-frequency resource is indicated to the helper UE by the base station (block 1330). For example, the source UE (e.g., using communication manager 140 and/or transmission component 1604, depicted in FIG. 16) may retransmit the sidelink communication in a second time-frequency resource of the single-frequency network, wherein the second time-frequency resource is indicated to the helper UE by the base station, as described above in connection with, for example, reference number 545 of FIG. 5 and/or reference number 655 of FIG. 6.

Process 1300 may include additional aspects, such as any single aspect or any combination of aspects described below and/or in connection with one or more other processes described elsewhere herein.

In a first aspect, the first time-frequency resource is a same time-frequency resource as is indicated by the base station to the helper UE for reception of the sidelink communication by the helper UE. In a second aspect, alone or in combination with the first aspect, the second time-frequency resource is a same time-frequency resource as is indicated by the base station to the helper UE for transmission of the sidelink communication by the helper UE to the destination UE. In a third aspect, alone or in combination with one or more of the first and second aspects, the signaling message indicates the first time-frequency resource to be used by the source UE for transmission of the sidelink communication and the second time-frequency resource to be used by the source UE for retransmission of the sidelink communication. In a fourth aspect, alone or in combination with one or more of the first through third aspects, process 1300 includes transmitting, to the base station, an indication that triggers the base station to identify the helper UE to monitor for and transmit the sidelink communication, wherein the signaling message is received based at least in part on transmitting the indication that triggers the base station to identify the helper UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
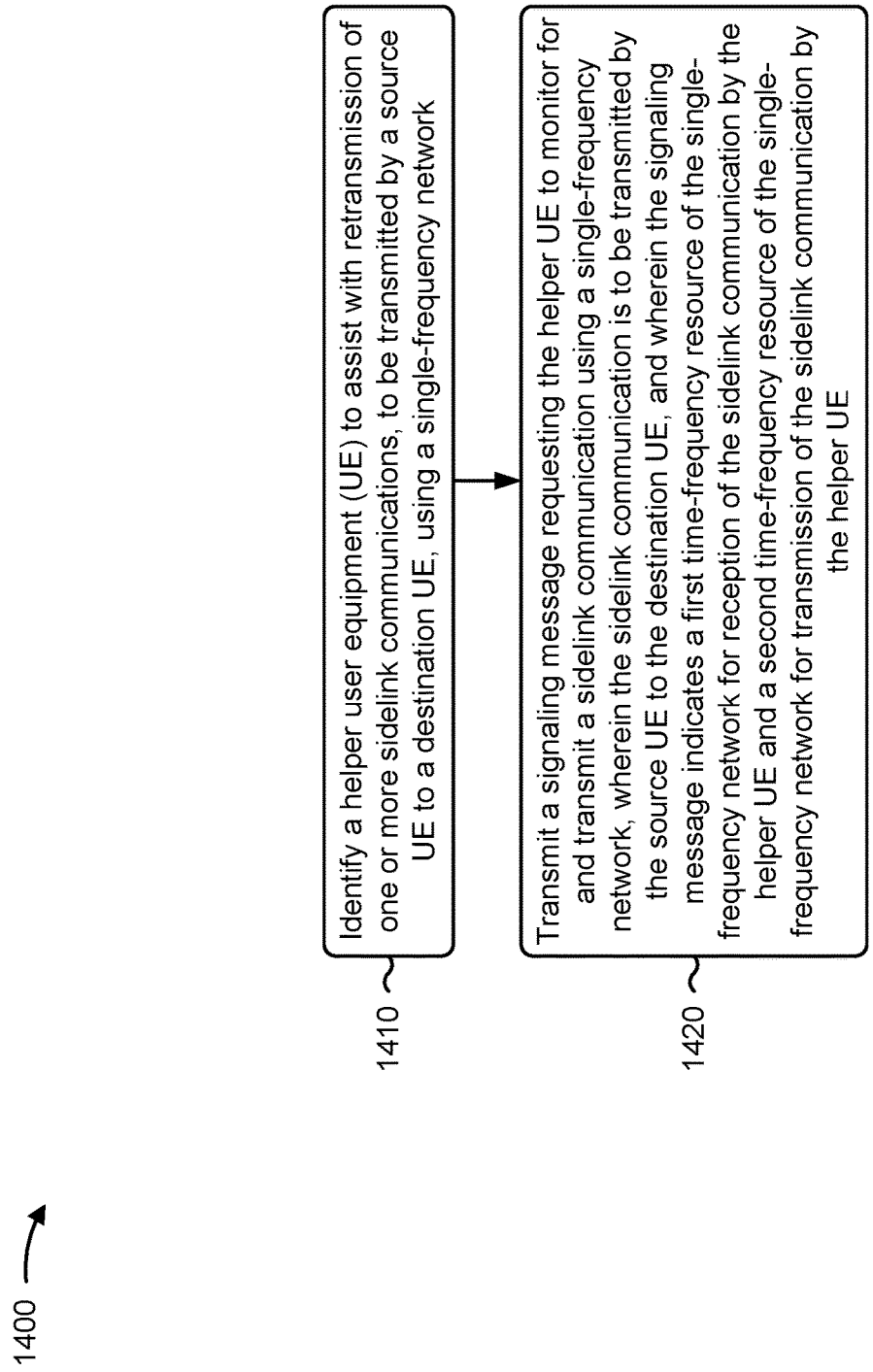

FIG. 14 is a diagram illustrating an example process 1400 performed, for example, by a base station, in accordance with the present disclosure. Example process 1400 is an example where the base station (e.g., base station 110) performs operations associated with retransmission of sidelink communications in an SFN.

As shown in FIG. 14, in some aspects, process 1400 may include identifying a helper UE to assist with retransmission of one or more sidelink communications, to be transmitted by a source UE to a destination UE, using a single-frequency network (block 1410). For example, the base station (e.g., using communication manager 150 and/or identification component 1708, depicted in FIG. 17) may identify a helper UE to assist with retransmission of one or more sidelink communications, to be transmitted by a source UE to a destination UE, using a single-frequency network, as described above in connection with, for example, reference number 520 of FIG. 5 and/or reference number 625 of FIG. 6.

As further shown in FIG. 14, in some aspects, process 1400 may include transmitting, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE (block 1420). For example, the base station (e.g., using communication manager 150 and/or transmission component 1704, depicted in FIG. 17) may transmit, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE, as described above in connection with, for example, reference number 525 of FIG. 5, reference number 630 of FIG. 6, and/or reference number 720 of FIG. 7.

Process 1400 may include additional aspects, such as any single aspect or any combination of aspects described below and/or in connection with one or more other processes described elsewhere herein.

In a first aspect, process 1400 includes transmitting, to the source UE, an indication of the first time-frequency resource to be used for transmission of the sidelink communication by the source UE. In a second aspect, alone or in combination with the first aspect, process 1400 includes transmitting, to the source UE, an indication of the second time-frequency resource to be used for retransmission of the sidelink communication by the source UE. In a third aspect, alone or in combination with one or more of the first and second aspects, the signaling message indicates at least one of a source UE identifier associated with the source UE or a destination UE identifier associated with the destination UE.

In a fourth aspect, alone or in combination with one or more of the first through third aspects, the signaling message indicates a sidelink resource to be used by the destination UE for transmission of an acknowledgement message that acknowledges reception of the sidelink communication transmitted by the source UE to the destination UE. In a fifth aspect, alone or in combination with one or more of the first through fourth aspects, the signaling message indicates more than two time-frequency resources of the single-frequency network, including the first time-frequency resource and the second time-frequency resource. In a sixth aspect, alone or in combination with one or more of the first through fifth aspects, the signaling message indicates at least one of a first resource to be used for transmission of a first acknowledgement message from the helper UE to the base station if the helper UE receives the sidelink communication in the first time-frequency resource, or a second resource to be used for transmission of a second acknowledgement message from the helper UE to the base station if the helper UE receives an acknowledgement message from the destination UE indicating that the destination UE has received the sidelink communication.

In a seventh aspect, alone or in combination with one or more of the first through sixth aspects, process 1400 includes transmitting, to the helper UE, another signaling message based at least in part on receiving the first acknowledgement message from the helper UE and failing to receive the second acknowledgment message from the helper UE, wherein the other signaling message indicates a third time-frequency resource of the single-frequency network to be used by the helper UE to transmit the sidelink communication. In an eighth aspect, alone or in combination with one or more of the first through seventh aspects, process 1400 includes transmitting an indication of a monitoring window to be monitored by the helper UE for the sidelink communication.

In a ninth aspect, alone or in combination with one or more of the first through eighth aspects, the signaling message includes a GC PDCCH message that indicates whether one or more UEs, in a group of UEs that includes the helper UE, are to monitor for and transmit one or more sidelink communications using the single-frequency network. In a tenth aspect, alone or in combination with one or more of the first through ninth aspects, the signaling message includes at least one of downlink control information or a configuration message that configures periodic sidelink communications by the helper UE. In an eleventh aspect, alone or in combination with one or more of the first through tenth aspects, process 1400 includes receiving, from the source UE, an indication that triggers the base station to identify the helper UE, wherein the signaling message is transmitted based at least in part on receiving the indication that triggers the base station to identify the helper UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
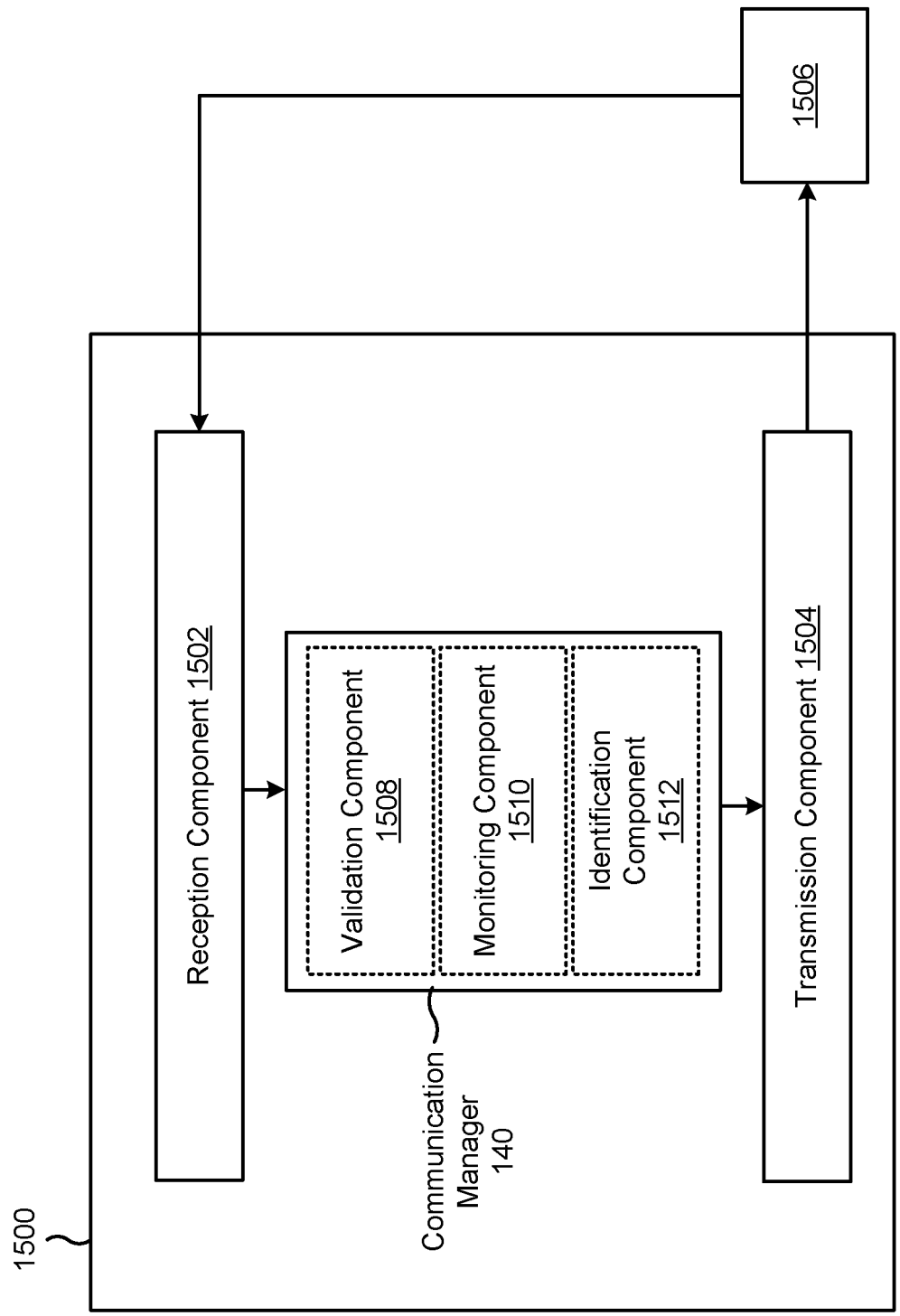
FIGS. 15-17 are diagrams of example apparatuses for wireless communication, in accordance with the present disclosure.

FIG. 15 is a diagram of an example apparatus 1500 for wireless communication. The apparatus 1500 may be a UE (e.g., a helper UE), or a UE (e.g., a helper UE) may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include one or more of a validation component 1508, a monitoring component 1510, or an identification component 1512, among other examples.

In some aspects, the apparatus 1500 may be configured to perform one or more operations described herein in connection with FIGS. 5-11. Additionally, or alternatively, the apparatus 1500 may be configured to perform one or more processes described herein, such as process 1200 of FIG. 12. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The reception component 1502 may receive, from a base station, a signaling message requesting the helper UE to monitor for and transmit a sidelink communication in a manner that uses a single-frequency network, wherein the sidelink communication is to be transmitted by a source UE to a destination UE that is different from the helper UE. The reception component 1502 may receive the sidelink communication, transmitted by the source UE to the destination UE, in a first time-frequency resource of the single-frequency network. The transmission component 1504 may transmit the sidelink communication in a second time-frequency resource of the single-frequency network, wherein the second time-frequency resource is indicated to the helper UE by the base station.

The validation component 1508 may validate the sidelink communication received in the first time-frequency resource, using at least one of the source UE identifier or the destination UE identifier, prior to transmitting the sidelink communication in the second time-frequency resource. The monitoring component 1510 and/or the reception component 1502 may monitor a resource for an acknowledgement message. The reception component 1502 may receive an indication of a monitoring window to be monitored by the helper UE for the sidelink communication. The identification component 1512 may identify the sidelink communication in the monitoring window using at least one of a source UE identifier associated with the source UE or a destination UE identifier associated with the destination UE, wherein at least one of the source UE identifier or the destination UE identifier is indicated in the signaling message.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
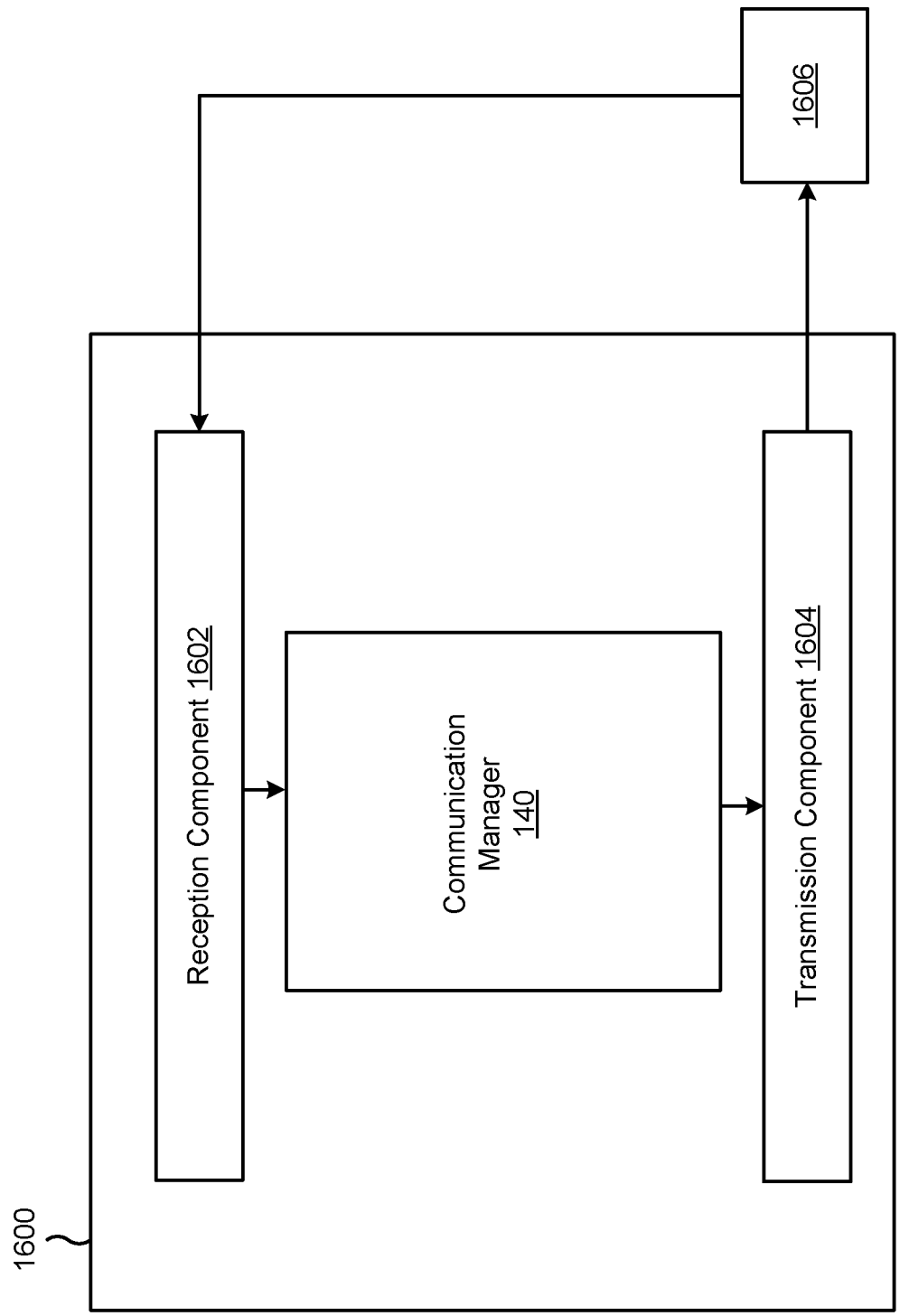

FIG. 16 is a diagram of an example apparatus 1600 for wireless communication. The apparatus 1600 may be a UE (e.g., a source UE), or a UE (e.g., a source UE) may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140.

In some aspects, the apparatus 1600 may be configured to perform one or more operations described herein in connection with FIGS. 5-11. Additionally, or alternatively, the apparatus 1600 may be configured to perform one or more processes described herein, such as process 1300 of FIG. 13. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive, from a base station, a signaling message indicating that a helper UE is to monitor for and transmit a sidelink communication, to be transmitted by the source UE to a destination UE, in a manner that uses a single-frequency network. The transmission component 1604 may transmit the sidelink communication to the destination UE in a first time-frequency resource of the single-frequency network based at least in part on receiving the signaling message. The transmission component 1604 may retransmit the sidelink communication in a second time-frequency resource of the single-frequency network, wherein the second time-frequency resource is indicated to the helper UE by the base station. The transmission component 1604 may transmit, to the base station, an indication that triggers the base station to identify the helper UE to monitor for and transmit the sidelink communication.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

FIG. 17 is a diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150. The communication manager 150 may include an identification component 1708, among other examples.

In some aspects, the apparatus 1700 may be configured to perform one or more operations described herein in connection with FIGS. 5-11. Additionally, or alternatively, the apparatus 1700 may be configured to perform one or more processes described herein, such as process 1400 of FIG. 14. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The identification component 1708 may identify a helper UE to assist with retransmission of one or more sidelink communications, to be transmitted by a source UE to a destination UE, using a single-frequency network. The transmission component 1704 may transmit, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE.

The transmission component 1704 may transmit, to the source UE, an indication of the first time-frequency resource to be used for transmission of the sidelink communication by the source UE. The transmission component 1704 may transmit, to the source UE, an indication of the second time-frequency resource to be used for retransmission of the sidelink communication by the source UE. The transmission component 1704 may transmit, to the helper UE, another signaling message based at least in part on receiving a first acknowledgement message from the helper UE and failing to receive a second acknowledgment message from the helper UE, wherein the other signaling message indicates a third time-frequency resource of the single-frequency network to be used by the helper UE to transmit the sidelink communication. The transmission component 1704 may transmit an indication of a monitoring window to be monitored by the helper UE for the sidelink communication. The reception component 1702 may receive, from the source UE, an indication that triggers the base station to identify the helper UE.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a helper user equipment (UE), comprising: receiving, from a base station, a signaling message requesting the helper UE to monitor for and transmit a sidelink communication in a manner that uses a single-frequency network, wherein the sidelink communication is to be transmitted by a source UE to a destination UE that is different from the helper UE; receiving the sidelink communication, transmitted by the source UE to the destination UE, in a first time-frequency resource of the single-frequency network; and transmitting the sidelink communication in a second time-frequency resource of the single-frequency network, wherein the second time-frequency resource is indicated to the helper UE by the base station.

Aspect 2: The method of Aspect 1, wherein the second time-frequency resource is a same time-frequency resource as is indicated by the base station to the source UE or another helper UE for transmission of the sidelink communication.

Aspect 3: The method of any of Aspects 1-2, wherein the sidelink communication is transmitted by the helper UE in the second time-frequency resource using a same waveform as is used for reception of the sidelink communication by the helper UE in the first time-frequency resource.

Aspect 4: The method of any of Aspects 1-3, wherein the signaling message indicates the first time-frequency resource to be used by the helper UE for reception of the sidelink communication and the second time-frequency resource to be used by the helper UE for transmission of the sidelink communication.

Aspect 5: The method of any of Aspects 1-4, wherein the sidelink communication transmitted by the helper UE in the second time-frequency resource is constructed by the helper UE based at least in part on a first transmission parameter indicated in the signaling message and a second transmission parameter determined from the sidelink communication received in the first time-frequency resource.

Aspect 6: The method of any of Aspects 1-5, wherein the signaling message indicates at least one of a source UE identifier associated with the source UE or a destination UE identifier associated with the destination UE.

Aspect 7: The method of Aspect 6, further comprising validating the sidelink communication received in the first time-frequency resource, using at least one of the source UE identifier or the destination UE identifier, prior to transmitting the sidelink communication in the second time-frequency resource.

Aspect 8: The method of any of Aspects 1-7, wherein the signaling message indicates a sidelink resource to be used by the destination UE for transmission of an acknowledgement message that acknowledges reception of the sidelink communication transmitted by the source UE to the destination UE.

Aspect 9: The method of Aspect 8, further comprising: monitoring the resource for the acknowledgement message; wherein the sidelink communication is transmitted in the second time-frequency resource based at least in part on a determination that the acknowledgment message is not received by the helper UE in the resource. wherein the sidelink communication is transmitted in the second time-frequency resource based at least in part on a determination that the acknowledgment message is not received by the helper UE in the resource.

Aspect 10: The method of any of Aspects 1-9, wherein the signaling message indicates more than two time-frequency resources of the single-frequency network, including the first time-frequency resource and the second time-frequency resource.

Aspect 11: The method any of Aspects 1-10, wherein the signaling message indicates at least one of: a first resource to be used for transmission of a first acknowledgement message from the helper UE to the base station if the helper UE receives the sidelink communication in the first time-frequency resource; or a second resource to be used for transmission of a second acknowledgement message from the helper UE to the base station if the helper UE receives an acknowledgement message from the destination UE indicating that the destination UE has received the sidelink communication.

Aspect 12: The method of any of Aspects 1-11, further comprising: receiving an indication of a monitoring window to be monitored by the helper UE for the sidelink communication; identifying the sidelink communication in the monitoring window using at least one of a source UE identifier associated with the source UE or a destination UE identifier associated with the destination UE, wherein at least one of the source UE identifier or the destination UE identifier is indicated in the signaling message; and wherein the sidelink communication is received in the first time-frequency resource based at least in part on monitoring for and identifying the sidelink communication in the monitoring window. wherein the sidelink communication is received in the first time-frequency resource based at least in part on monitoring for and identifying the sidelink communication in the monitoring window.

Aspect 13: The method of any of Aspects 1-12, wherein the signaling message includes a group common (GC) physical downlink control channel (PDCCH) message that indicates whether one or more UEs, in a group of UEs that includes the helper UE, are to monitor for and transmit one or more sidelink communications using the single-frequency network.

Aspect 14: The method of any of Aspects 1-13, wherein the signaling message includes at least one of downlink control information or a configuration message that configures periodic sidelink communications for the helper UE.

Aspect 15: A method of wireless communication performed by a source user equipment (UE), comprising: receiving, from a base station, a signaling message indicating that a helper UE is to monitor for and transmit a sidelink communication, to be transmitted by the source UE to a destination UE, in a manner that uses a single-frequency network; and transmitting the sidelink communication to the destination UE in a first time-frequency resource of the single-frequency network based at least in part on receiving the signaling message; and retransmitting the sidelink communication in a second time-frequency resource of the single-frequency network, wherein the second time-frequency resource is indicated to the helper UE by the base station.

Aspect 16: The method of Aspect 15, wherein the first time-frequency resource is a same time-frequency resource as is indicated by the base station to the helper UE for reception of the sidelink communication by the helper UE.

Aspect 17: The method of any of Aspects 15-16, wherein the second time-frequency resource is a same time-frequency resource as is indicated by the base station to the helper UE for transmission of the sidelink communication by the helper UE to the destination UE.

Aspect 18: The method of any of Aspects 15-17, wherein the signaling message indicates the first time-frequency resource to be used by the source UE for transmission of the sidelink communication and the second time-frequency resource to be used by the source UE for retransmission of the sidelink communication.

Aspect 19: The method of any of Aspects 15-18, further comprising: transmitting, to the base station, an indication that triggers the base station to identify the helper UE to monitor for and transmit the sidelink communication; wherein the signaling message is received based at least in part on transmitting the indication that triggers the base station to identify the helper UE. wherein the signaling message is received based at least in part on transmitting the indication that triggers the base station to identify the helper UE.

Aspect 20: A method of wireless communication performed by a base station, comprising: identifying a helper user equipment (UE) to assist with retransmission of one or more sidelink communications, to be transmitted by a source UE to a destination UE, using a single-frequency network; and transmitting, to the helper UE, a signaling message requesting the helper UE to monitor for and transmit a sidelink communication using a single-frequency network, wherein the sidelink communication is to be transmitted by the source UE to the destination UE, and wherein the signaling message indicates a first time-frequency resource of the single-frequency network for reception of the sidelink communication by the helper UE and a second time-frequency resource of the single-frequency network for transmission of the sidelink communication by the helper UE.

Aspect 21: The method of Aspect 20, further comprising transmitting, to the source UE, an indication of the first time-frequency resource to be used for transmission of the sidelink communication by the source UE.

Aspect 22: The method of any of Aspects 20-21, further comprising transmitting, to the source UE, an indication of the second time-frequency resource to be used for retransmission of the sidelink communication by the source UE.

Aspect 23: The method of any of Aspects 20-22, wherein the signaling message indicates at least one of a source UE identifier associated with the source UE or a destination UE identifier associated with the destination UE.

Aspect 24: The method of any of Aspects 20-23, wherein the signaling message indicates a sidelink resource to be used by the destination UE for transmission of an acknowledgement message that acknowledges reception of the sidelink communication transmitted by the source UE to the destination UE.

Aspect 25: The method of any of Aspects 20-24, wherein the signaling message indicates more than two time-frequency resources of the single-frequency network, including the first time-frequency resource and the second time-frequency resource.

Aspect 26: The method of any of Aspects 20-25, wherein the signaling message indicates at least one of: a first resource to be used for transmission of a first acknowledgement message from the helper UE to the base station if the helper UE receives the sidelink communication in the first time-frequency resource; or a second resource to be used for transmission of a second acknowledgement message from the helper UE to the base station if the helper UE receives an acknowledgement message from the destination UE indicating that the destination UE has received the sidelink communication.

Aspect 27: The method of Aspect 26, further comprising transmitting, to the helper UE, another signaling message based at least in part on receiving the first acknowledgement message from the helper UE and failing to receive the second acknowledgment message from the helper UE, wherein the other signaling message indicates a third time-frequency resource of the single-frequency network to be used by the helper UE to transmit the sidelink communication.

Aspect 28: The method of any of Aspects 20-27, further comprising transmitting an indication of a monitoring window to be monitored by the helper UE for the sidelink communication.

Aspect 29: The method of any of Aspects 20-28, wherein the signaling message includes a group common (GC) physical downlink control channel (PDCCH) message that indicates whether one or more UEs, in a group of UEs that includes the helper UE, are to monitor for and transmit one or more sidelink communications using the single-frequency network.

Aspect 30: The method of any of Aspects 20-29, wherein the signaling message includes at least one of downlink control information or a configuration message that configures periodic sidelink communications by the helper UE.

Aspect 31: The method of any of Aspects 20-30, further comprising: receiving, from the source UE, an indication that triggers the base station to identify the helper UE; wherein the signaling message is transmitted based at least in part on receiving the indication that triggers the base station to identify the helper UE. wherein the signaling message is transmitted based at least in part on receiving the indication that triggers the base station to identify the helper UE.

Aspect 32: An apparatus for wireless communication at a device, comprising a processor; memory coupled with the processor; and instructions stored in the memory and executable by the processor to cause the apparatus to perform the method of one or more of Aspects 1-14.

Aspect 33: A device for wireless communication, comprising a memory and one or more processors coupled to the memory, the one or more processors configured to perform the method of one or more of Aspects 1-14.

Aspect 34: An apparatus for wireless communication, comprising at least one means for performing the method of one or more of Aspects 1-14.

Aspect 35: A non-transitory computer-readable medium storing code for wireless communication, the code comprising instructions executable by a processor to perform the method of one or more of Aspects 1-14.

Aspect 36: A non-transitory computer-readable medium storing a set of instructions for wireless communication, the set of instructions comprising one or more instructions that, when executed by one or more processors of a device, cause the device to perform the method of one or more of Aspects 1-14.

Aspect 37: An apparatus for wireless communication at a device, comprising a processor; memory coupled with the processor; and instructions stored in the memory and executable by the processor to cause the apparatus to perform the method of one or more of Aspects 15-19.

Aspect 38: A device for wireless communication, comprising a memory and one or more processors coupled to the memory, the one or more processors configured to perform the method of one or more of Aspects 15-19.

Aspect 39: An apparatus for wireless communication, comprising at least one means for performing the method of one or more of Aspects 15-19.

Aspect 40: A non-transitory computer-readable medium storing code for wireless communication, the code comprising instructions executable by a processor to perform the method of one or more of Aspects 15-19.

Aspect 41: A non-transitory computer-readable medium storing a set of instructions for wireless communication, the set of instructions comprising one or more instructions that, when executed by one or more processors of a device, cause the device to perform the method of one or more of Aspects 15-19.

Aspect 42: An apparatus for wireless communication at a device, comprising a processor; memory coupled with the processor; and instructions stored in the memory and executable by the processor to cause the apparatus to perform the method of one or more of Aspects 20-31.

Aspect 43: A device for wireless communication, comprising a memory and one or more processors coupled to the memory, the one or more processors configured to perform the method of one or more of Aspects 20-31.

Aspect 44: An apparatus for wireless communication, comprising at least one means for performing the method of one or more of Aspects 20-31.

Aspect 45: A non-transitory computer-readable medium storing code for wireless communication, the code comprising instructions executable by a processor to perform the method of one or more of Aspects 20-31.

Aspect 46: A non-transitory computer-readable medium storing a set of instructions for wireless communication, the set of instructions comprising one or more instructions that, when executed by one or more processors of a device, cause the device to perform the method of one or more of Aspects 20-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a helper user equipment (UE), comprising:
   receiving, from a base station, a signaling message requesting the helper UE to monitor a first time-frequency resource for a first transmission of a sidelink communication from a source UE to a destination UE and transmit a retransmission of the sidelink communication in a single-frequency network manner, wherein the sidelink communication is scheduled for transmission by the source UE to the destination UE that is different from the helper UE, wherein the signaling message indicates the first time-frequency resource and a second time-frequency resource corresponding to the retransmission of the sidelink communication, wherein the signaling message indicates a first resource for transmission of a first acknowledgement message from the helper UE to the base station if the helper UE receives the sidelink communication in the first time-frequency resource and further indicates a second resource for transmission of a second acknowledgement message from the helper UE to the base station if the helper UE receives an acknowledgement message from the destination UE indicating that the destination UE has received the sidelink communication;
   receiving the first transmission of the sidelink communication to the destination UE, transmitted by the source UE to the destination UE, in the first time-frequency resource, based at least in part on receiving the signaling message;
   transmitting the retransmission of the sidelink communication in the second time-frequency resource in the single-frequency network manner in response to receiving the first transmission; and
   transmitting one or more of the first acknowledgement message or the second acknowledgement message.

2. The method of claim 1, wherein the second time-frequency resource is a same time-frequency resource as is indicated by the base station to the source UE or another helper UE for transmission of the sidelink communication.

3. The method of claim 1, wherein the sidelink communication is transmitted by the helper UE in the second time-frequency resource using a same waveform as is used for reception of the sidelink communication by the helper UE in the first time-frequency resource.

4. The method of claim 1, wherein the sidelink communication transmitted by the helper UE in the second time-frequency resource is constructed by the helper UE based at least in part on a first transmission parameter indicated in the signaling message and a second transmission parameter determined from the sidelink communication received in the first time-frequency resource.

5. The method of claim 1, wherein the signaling message indicates at least one of a source UE identifier associated with the source UE or a destination UE identifier associated with the destination UE.

6. The method of claim 1, wherein the signaling message indicates a sidelink resource for transmission of an acknowledgement message by the destination UE that acknowledges reception of the sidelink communication transmitted by the source UE to the destination UE.

7. The method of claim 1, wherein the signaling message indicates more than two time-frequency resources of the single-frequency network, including the first time-frequency resource and the second time-frequency resource.

8. The method of claim 1, further comprising:
receiving an indication of a monitoring window for the sidelink communication; and
identifying the sidelink communication in the monitoring window using at least one of a source UE identifier associated with the source UE or a destination UE identifier associated with the destination UE, wherein at least one of the source UE identifier or the destination UE identifier is indicated in the signaling message; and
wherein the sidelink communication is received in the first time-frequency resource based at least in part on monitoring for and identifying the sidelink communication in the monitoring window.

9. The method of claim 1, wherein the signaling message includes a group common (GC) physical downlink control channel (PDCCH) message that indicates whether one or more UEs, in a group of UEs that includes the helper UE, are to monitor for the sidelink communication and transmit a retransmission of the sidelink communication using the single-frequency network.

10. The method of claim 1, wherein the signaling message comprises an indication of one or more beams of the helper UE, wherein the indication of one or more beams comprises an indication of one or more receive beams of the helper UE, wherein receiving the sidelink communication further comprises:
receiving the sidelink communication using the one or more receive beams.

11. The method of claim 1, wherein the signaling message comprises an indication of one or more beams of the helper UE, wherein the indication of one or more beams comprises an indication of one or more transmit beams of the helper UE, wherein transmitting the sidelink communication further comprises:
transmitting the retransmission of the sidelink communication using the one or more transmit beams.

12. A helper user equipment (UE) for wireless communication, comprising:
one or more memories; and
one or more processors, coupled to the one or more memories, configured to:
receive, from a base station, a signaling message requesting the helper UE to monitor a first time-frequency resource for a first transmission of sidelink communication from a source UE to a destination UE and transmit a retransmission of the sidelink communication in a single-frequency network manner, wherein the sidelink communication is scheduled for transmission by the source UE to the destination UE that is different from the helper UE, wherein the signaling message indicates the first time-frequency resource and a second time-frequency resource corresponding to the retransmission of the sidelink communication, wherein the signaling message indicates a first resource for transmission of a first acknowledgement message from the helper UE to the base station if the helper UE receives the sidelink communication in the first time-frequency resource and further indicates a second resource for transmission of a second acknowledgement message from the helper UE to the base station if the helper UE receives an acknowledgement message from the destination UE indicating that the destination UE has received the sidelink communication;
receive the first transmission of the sidelink communication to the destination UE, transmitted by the source UE to the destination UE, in the first time-frequency resource, based at least in part on receiving the signaling message;
transmit the retransmission of the sidelink communication in the second time-frequency resource in the single-frequency network manner in response to receiving the first transmission; and
transmit one or more of the first acknowledgement message or the second acknowledgement message.

13. The helper UE of claim 12, wherein the second time-frequency resource is a same time-frequency resource as is indicated by the base station to the source UE or another helper UE for transmission of the sidelink communication.

14. The helper UE of claim 12, wherein the sidelink communication is transmitted by the helper UE in the second time-frequency resource using a same waveform as is used for reception of the sidelink communication by the helper UE in the first time-frequency resource.

15. The helper UE of claim 12, wherein the sidelink communication transmitted by the helper UE in the second time-frequency resource is constructed by the helper UE based at least in part on a first transmission parameter indicated in the signaling message and a second transmission parameter determined from the sidelink communication received in the first time-frequency resource.

16. The helper UE of claim 12, wherein the signaling message indicates at least one of a source UE identifier associated with the source UE or a destination UE identifier associated with the destination UE.

17. The helper UE of claim 12, wherein the signaling message indicates a sidelink resource for transmission of an acknowledgement message by the destination UE that acknowledges reception of the sidelink communication transmitted by the source UE to the destination UE.

18. The helper UE of claim 12, wherein the signaling message indicates more than two time-frequency resources of the single-frequency network, including the first time-frequency resource and the second time-frequency resource.

19. The helper UE of claim 12, wherein the one or more processors are further configured to:
receive an indication of a monitoring window for the sidelink communication; and
identify the sidelink communication in the monitoring window using at least one of a source UE identifier associated with the source UE or a destination UE identifier associated with the destination UE, wherein at least one of the source UE identifier or the destination UE identifier is indicated in the signaling message; and wherein the sidelink communication is received in the first time-frequency resource based at least in part on monitoring for and identifying the sidelink communication in the monitoring window.

20. The helper UE of claim 12, wherein the signaling message includes a group common (GC) physical downlink control channel (PDCCH) message that indicates whether one or more UEs, in a group of UEs that includes the helper UE, are to monitor for the sidelink communication and transmit a retransmission of the sidelink communication using the single-frequency network.

\* \* \* \* \*